(12) United States Patent
Wyatt et al.

(10) Patent No.: US 8,738,765 B2
(45) Date of Patent: May 27, 2014

(54) MOBILE DEVICE DNS OPTIMIZATION

(75) Inventors: Timothy Micheal Wyatt, Oakland, CA (US); Anbu Anbalagapandian, San Francisco, CA (US); Ayan Mandal, Oakland, CA (US)

(73) Assignee: Lookout, Inc., San Francisco, GA (US)

( * ) Notice: Subject to any disclaimer, the term of this patent is extended or adjusted under 35 U.S.C. 154(b) by 193 days.

(21) Appl. No.: 13/160,447

(22) Filed: Jun. 14, 2011

(65) Prior Publication Data

US 2012/0324094 A1    Dec. 20, 2012

(51) Int. Cl.
*G06F 15/16* (2006.01)
*G06F 15/173* (2006.01)

(52) U.S. Cl.
USPC ............................ 709/224; 709/227; 709/245

(58) Field of Classification Search
USPC ......................................................... 709/224
See application file for complete search history.

(56) References Cited

U.S. PATENT DOCUMENTS

| | | | |
|---|---|---|---|
| 3,416,032 A | 12/1968 | Jahns et al. |
| 4,553,257 A | 11/1985 | Mori et al. |
| 5,319,776 A | 6/1994 | Hile et al. |
| 5,574,775 A | 11/1996 | Miller, II et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |

(Continued)

FOREIGN PATENT DOCUMENTS

| | | |
|---|---|---|
| GB | 2430588 | 3/2007 |
| WO | 2005101789 | 10/2005 |

(Continued)

OTHER PUBLICATIONS

Jung, Jaeyeon et al. "DNS Performance and the Effectiveness of Caching," IEEE/ACM Transactions on Networking, vol. 10, Issue 5, Oct. 2002, pp. 589-603.*

(Continued)

*Primary Examiner* — Melvin H Pollack
(74) *Attorney, Agent, or Firm* — Dergosits & Noah LLP

(57) ABSTRACT

When a mobile device interacts with a network service, synchronous DNS resolution can significantly impact user experience due to lossy or moderate-high latency conditions. Network services that rely on low-TTL DNS records for failover require a client to frequently resolve the service's host name. It is undesirable to block on these frequent resolutions. In an implementation, user activity on a mobile device is monitored to determine whether the user is engaged in an activity that would contact a server. If such an activity is in progress, then DNS requests to resolve the server's host name are periodically generated to make sure the server's IP address is cached. In an implementation, if a request to communicate with a server fails, the DNS cache expires the entry for that server so that a new DNS request can resolve the server's IP address in case the server's IP address has changed.

22 Claims, 12 Drawing Sheets

(56) References Cited

U.S. PATENT DOCUMENTS

| | | |
|---|---|---|
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 * | 8/2008 | Nakazawa ............... 709/245 |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,809,353 B2 | 10/2010 | Brown et al. |
| 7,809,366 B2 | 10/2010 | Rao et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 * | 8/2011 | Bahl ........................ 709/220 |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 * | 10/2011 | Accapadi et al. ............ 709/238 |
| 8,054,219 B2 | 11/2011 | Alizadeh-Shabdiz |
| 8,087,082 B2 * | 12/2011 | Bloch et al. ................. 726/22 |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 * | 1/2012 | Awadallah et al. .......... 709/245 |
| 8,121,617 B1 | 2/2012 | LaGrotta et al. |
| 8,126,456 B2 | 2/2012 | Lotter et al. |
| 8,127,358 B1 | 2/2012 | Lee |
| 8,135,395 B2 | 3/2012 | Cassett et al. |
| 8,195,196 B2 * | 6/2012 | Haran et al. ............... 455/456.3 |
| 8,259,568 B2 * | 9/2012 | Laudermilch et al. ......... 370/230 |
| 8,261,351 B1 * | 9/2012 | Thornewell et al. ........... 726/23 |
| 8,266,288 B2 * | 9/2012 | Banerjee et al. ............. 709/226 |
| 8,266,324 B2 * | 9/2012 | Baratakke et al. ............ 709/245 |
| 8,346,860 B2 * | 1/2013 | Berg et al. .................... 709/203 |
| 8,356,080 B2 * | 1/2013 | Luna et al. .................... 709/216 |
| 8,364,785 B2 * | 1/2013 | Plamondon ................... 709/219 |
| 8,370,580 B2 * | 2/2013 | Mobarak et al. ............. 711/133 |
| 8,370,933 B1 * | 2/2013 | Buckler ......................... 726/22 |
| 8,401,521 B2 * | 3/2013 | Bennett et al. ............... 455/411 |
| 8,447,856 B2 * | 5/2013 | Drako ........................... 709/225 |
| 8,463,915 B1 * | 6/2013 | Kim ............................. 709/227 |
| 8,484,332 B2 * | 7/2013 | Bush et al. .................... 709/223 |
| 8,504,775 B2 * | 8/2013 | Plamondon ................... 711/133 |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0133624 A1 | 7/2004 | Park |
| 2004/0158741 A1 | 8/2004 | Schneider |
| 2004/0185900 A1 | 9/2004 | McElveen |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Bryne et al. |
| 2007/0028095 A1 | 2/2007 | Allen et al. |

(56) References Cited

U.S. PATENT DOCUMENTS

| | | |
|---|---|---|
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0154014 A1 | 7/2007 | Aissi et al. |
| 2007/0174472 A1 | 7/2007 | Kulakowski |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1* | 11/2007 | Janneteau et al. ............ 370/338 |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0088398 A1* | 4/2010 | Plamondon ............ 709/220 |
| 2010/0097494 A1 | 4/2010 | Gum et al. |
| 2010/0100939 A1 | 4/2010 | Mahaffey et al. |
| 2010/0100963 A1 | 4/2010 | Mahaffey |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0332593 A1 | 12/2010 | Barash et al. |
| 2010/0332680 A1* | 12/2010 | Anderson et al. ............ 709/245 |
| 2011/0119765 A1 | 5/2011 | Hering et al. |
| 2011/0171923 A1 | 7/2011 | Daly et al. |
| 2011/0296510 A1 | 12/2011 | Hatlelid et al. |
| 2012/0072569 A1* | 3/2012 | Xu ............ 709/223 |
| 2012/0124239 A1* | 5/2012 | Shribman et al. ............ 709/245 |
| 2012/0159636 A1* | 6/2012 | Pandya et al. ............ 726/26 |
| 2012/0179801 A1* | 7/2012 | Luna et al. ............ 709/223 |
| 2012/0179814 A1* | 7/2012 | Swildens et al. ............ 709/224 |
| 2012/0188064 A1 | 7/2012 | Mahaffey et al. |
| 2012/0196571 A1 | 8/2012 | Grkov et al. |
| 2012/0215938 A1* | 8/2012 | Fletcher et al. ............ 709/238 |
| 2012/0259954 A1* | 10/2012 | McCarthy et al. ............ 709/218 |
| 2012/0278467 A1* | 11/2012 | Schneider ............ 709/223 |
| 2012/0303735 A1* | 11/2012 | Raciborski et al. ............ 709/212 |
| 2012/0317153 A1* | 12/2012 | Parthasarathy et al. ....... 707/805 |
| 2012/0317233 A1* | 12/2012 | Redpath ............ 709/218 |
| 2012/0317370 A1* | 12/2012 | Luna ............ 711/146 |
| 2012/0324076 A1* | 12/2012 | Zerr et al. ............ 709/223 |
| 2013/0013775 A1* | 1/2013 | Baumback et al. ............ 709/224 |
| 2013/0019311 A1* | 1/2013 | Swildens et al. ............ 726/23 |
| 2013/0023209 A1* | 1/2013 | Fisher et al. ............ 455/41.1 |
| 2013/0041946 A1* | 2/2013 | Joel et al. ............ 709/203 |
| 2013/0041974 A1* | 2/2013 | Luna et al. ............ 709/213 |
| 2013/0054796 A1* | 2/2013 | Baumback et al. ............ 709/224 |
| 2013/0067054 A1* | 3/2013 | Pulleyn et al. ............ 709/223 |

FOREIGN PATENT DOCUMENTS

| | | |
|---|---|---|
| WO | 2006110181 | 10/2006 |
| WO | 2007081356 | 7/2007 |
| WO | 2008007111 | 1/2008 |
| WO | 2008057737 | 5/2008 |

OTHER PUBLICATIONS

Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.*

Liljeberg, M. et al. "Optimizing World-Wide Web for Weakly Connected Mobile Workstations: An Indirect Approach," Second International Workshop on Services in Distributed and Networked Environments, Jun. 5-6, 1995, pp. 132-139.*

Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.*

Jeffries, Charles P., "Webroot AntiVirus 2010 With Spy Sweeper Full Review", Jun. 22, 2010, available at <http://www.notebookreview.comt>accessed May 18, 2011, 3 pages.

Pogue, David, "Simplifying the Lives of Web Users", Aug. 18, 2010, available at <http://www.nytimes.com/2010/08/19/technology/>, accessed May 17, 2011, 5 pages.

Fette, Ian, Chromium Blog, "Understanding Phishing and Malware Protection in Google Chrome", Nov. 14, 2008, available at <http://blog.chromium.org/2008/11>, 6 pages.

Richardson, Alexis "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.

Fisher, Oliver "Malware? We Don't Need No Stinking Malware!," Google, Oct. 24, 2008, available at <http://googlewebmastercentral.blogspot.com/2008/10/malware-we-dont-need-no-stinking.html>, retrieved Mar. 30, 2012, 11 pages.

Reardon, Marguerite "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.

Fette, Ian "Understanding Phishing and Malware Protection in Google Chrome," The Chromium Blog, Nov. 14, 2008, available at <http://blog.chromium.org/2008/11/understanding-phishing-and-malware.htm>, retrieved May 17, 2011, 6 pages.

Kincaid, Jason "Urban Airship Brings Easy Push Notifications to Android," TechCrunch, Aug. 10, 2010, available at <http://techcrunch.com/2010/08/10/urban-airship-brings-easy-push-notifications-to-android/>, retrieved Jun. 16, 2011, 5 pages.

Keane, Justin K. "Using the Google Safe Browsing API from PHP," Mad Irish, Aug. 7, 2009, available at <http://www.madirish.net/node/245>, retrieved Mar. 30, 2012, 5 pages.

(56) References Cited

OTHER PUBLICATIONS

Jefferies, Charles P. "Webroot AntiVirus 2010 With Spy Sweeper Review," Notebook Review, Jun. 22, 2010, available at <http://http://www.notebookreview.com/default.asp?newsID=5700&review=Webroot+AntiVirus+2010+With+Spy+Sweeper+Review>, retrieved May 18, 2011, 3 pages.
"Berry Locator", 2007, Mobireport LLC, 1 page.
"Firefox", Wikipedia, Jul. 20, 2011, available at <http://en.wikipedia.org/wiki/firefox> Retrieved Aug. 10, 2011, 37 Pages.
"F-Secure Mobile Security for S60 Users Guide", F-Secure Corporation 2009, pp. 1-34.
"Java Virtual Machine", Wikipedia, Aug. 7, 2011, Available at <http://en.wikipedia.org/wiki/Java_Virtual_Machine> Retrieved Aug. 10, 2011, 7 pages.
"Kaspersky Mobile Security", Kaspersky Lab 1997-2007, 1 page.
"Kaspersky Mobile Security", Kaspersky Lab 2008, available at <http://www.kaspersky.com/kaspersky_mobile_security> Retrieved Sep. 11, 2008, 2 Pages.
"Norton Smartphone Security",Symantec, 2007, Available at <http://www.symantec.com/norton/smartphone-security> Retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Symantec Endpoint Protection", Symantec, 2008, Available at <http://www.symantec.com/business/products/family.jsp?familyid=endpointsecurity>, 6 pages.
"Symantec Mobile Security Suite for Windows Mobile", Symantec, 2008 Available at <http://www.symantec.com/business/products/sysreq.jsp?pcid=2241&pvid=mobile_security_suite_1>, 5 pages.
"TippingPoint Security Management System (SMS)", TippingPoint, Available at <http://www.tippingpoint.com/products_sms.html>, 2 pages.
Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-find-out-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.
"BlackBerry Push Service Overview," Dec. 16, 2009, available at <http://us.blackberry.com/developers/platform/pushapi.jsp#tab_tab_resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/8273/esoft-unveils-sitefilter-30-for-oems/>, retrieved Mar. 30, 2012, 2 pages.
"Get the Physical Location of Wireless Router From its MAC Address (BSSID)," Coderrr, Sep. 10, 2008, available at <http://coderrr.wordpress.com/2008/09/10/get-the-physical-location-of-wireless-router-from-its-mac-address-bssid/>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.
Mytton, David "How to Build an Apple Push Notification Provider Server (Tutorial)," Server Density, Jul. 10, 2009, available at <http://blog.serverdensity.com/2009/07/10/how-to-build-an-apple-push-notification-provider-server-tutorial/>, retrieved Apr. 2, 2012, 33 pages.
"Pidgin The Universal Chat Client," Pidign, available at <http://www.pidgin.im/>, retrieved Sep. 14, 2011, 14 pages.
Pogue, David "Simplifying the Lives of Web Users," The New York Times, Aug. 18, 2010, available at <http://www.nytimes.com/2010/08/19/technology/personaltech/19pogue.html>, retrieved May 17, 2011, 5 pages.

"Twilio Cloud Communications Web Service API for Building Voice and SMS Applications," Twilio available at <http://www.twilio.com>, retrieved Sep. 14, 2011, 12 pages.
"Understanding Direct Push," Microsoft, Feb. 18, 2009, available at <http://technet.microsoft.com/en-us/library/aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https://zvelo.com/technology/zvelodb-url-database>, retrieved Mar. 30, 2012, 2 pages.
U.S. Appl. No. 11/397,521.
U.S. Appl. No. 13/284,248.
U.S. Appl. No. 13/313,937.
U.S. Appl. No. 13/314,032.
U.S. Appl. No. 13/333,654.
U.S. Appl. No. 13/335,779.
U.S. Appl. No. 13/410,979.
Amazon.com: Mining the Web Discovering Knowledge from Hypertext Data (9781558607545): Soumen Chakrabarti: Books, Amazon available at <http://www.amazon.com/exec/obidos/ASIN/1558607544/>, retrieved Jun. 7, 2012, pp. 1-7.
Clickatell, available at <http://www.clickatell.com>, retrieved Sep. 14, 2011, 11 pages.
Dolcourt, Jessica; Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al., Focused Crawling Using Context Graphs:, Proceedings of the 26th VLDB Conference, Cairo, Egypt, 2000, pp. 1-8.
Grafio "Stay Secure", Opera Software, Sep. 29, 2008, Available at <http://widgets.opera.com/widget/4495> Retrieved Oct. 21, 2008, 4 pages.
McAfee, Internet Archive, Way Back Machine, available at <http://web.archive.org/web/20080611095201/www.qualys.com/solutions/vulnerability_management>retrieved Feb. 24, 2011, 1 page.
MobileWipe web page, pp. 1-4.
PagerDuty, available at <http://www.pagerduty.com>, retrieved Sep. 14, 2011, 23 pages.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010; pp. 1-16.
PCT International Search Report and Written Opinion of the International Searching Authority for PCT/US2011/049182; Mailed on Dec. 23, 2011; pp. 1-11.
Prey, available at <http://preyproject.com/>, retrieved Jan. 10, 2012, 4 pages.
Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Real world Computing, Jun. 16, 2008 (PC Pro), pp. 1-2.
Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.
Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.
Trillian, available at <http://www.trillian.im/>, retrieved Sep. 14, 2011, 24 pages.
U.S. Appl. No. 12/255,614.
U.S. Appl. No. 12/255,626.
U.S. Appl. No. 12/255,635.
U.S. Appl. No. 13/033,025; Prosecution history available via USPTO.
U.S. Appl. No. 13/212,055; Prosecution history available via USPTO.

(56) References Cited

OTHER PUBLICATIONS

U.S. Appl. No. 12/255,632.
U.S. Appl. No. 13/160,382.
U.S. Appl. No. 12/372,719.
U.S. Appl. No. 12/621,431.
U.S. Appl. No. 12/868,669.
U.S. Appl. No. 12/868,672.
U.S. Appl. No. 12/868,676.
U.S. Appl. No. 12/876,018.
U.S. Appl. No. 13/160,447.
U.S. Appl. No. 13/162,477.
U.S. Appl. No. 13/267,731.
Virus Total, VT Community, www.virustotal.com/index.html; Dated Dec. 16, 2011; 44 Pages.
Windows Update, Internet Archive, Way Back Machine, available at <http://web.archive.org/web/20071022193017/http://en.wikipedia.org/wiki/Windows_Update> Retrieved Feb. 23, 2011, 3 pages.
PCT International Preliminary Report on Patentability for PCT/US2011/049182; Mailed on Mar. 7, 2013; pp. 1-9.
U.S. Appl. No. 13/460,549.
U.S. Appl. No. 13/461,054.
U.S. Appl. No. 13/461,984.
U.S. Appl. No. 12/255,621.
U.S. Appl. No. 13/741,988.
U.S. Appl. No. 13/689,588.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

* cited by examiner

Adult Materials
 Child Inappropriate
 Lingerie, Suggestive & Pinup
 Nudity
 Pornography
 R-Rated
 Sex & Erotic
 Sex Education & Pregnancy
 Violence
 Weapons
Business / Services
 Business & Services (General)
  Agriculture
  Architecture & Construction
  Biotechnology
  Home & Office Furnishings
 Contests & Surveys
 Finance (General)
  Banking
  Insurance
  Online Financial Tools
  Online Stock Trading
Communication
 Chat
 Community Forums
 Instant Messenger
 Personal Pages & Blogs
 Photo Sharing
 Professional Networking
 Social Networking
 Text Messaging & SMS
 Web-based E-mail
Criminal Activities
 Criminal Skills
 Hacking
 Hate Speech
 Illegal Drugs

Education
 Educational Institutions
 Educational Materials
 Literature & Books
 Reference Materials
 School Cheating
Entertainment
 Arts
 Cartoons
 Humor
 Music & Audio
 Television & Movies
Games
 Gambling
 Games
Health
 Alcohol
 Health & Medical
 Nutrition & Diet
 Pharmaceuticals
Information Tech
 Anonymizer
 File Repositories
 Peer-to-Peer
 Personal Storage
 Technology (General)
  Information Security
  Mobile Phones
  Software
Lifestyle
 Motorized Vehicles
 Dating & Relationships
 Fashion & Beauty
 Food & Restaurants
 Hobbies & Leisure

Miscellaneous
 Content Server
 Login Screens
 Private IP Address
 Redirect
 Unreachable
News
 Entertainment News
 News & Magazines
Politics
 Advocacy Groups
 Government Sponsored
 Legislation
 Military
 Religion
Search Engines
 Image Search
 Portal Sites
 Search Engines
Security
 Botnet
 Command Centers
 Compromised Malware Links
 Malware Distribution Point
 Parked & For Sale Domains
 Phishing/Fraud
 Spam URLs
 Spyware & Questionable SW
Shopping
 Auctions & Marketplaces
 Catalogs
 Product Reviews
 Toys

FIG. 11

MOBILE DEVICE DNS OPTIMIZATION

TECHNICAL FIELD

This disclosure relates generally to domain name information, and specifically, to managing domain name information on a mobile device.

BACKGROUND OF THE INVENTION

Portable electronic devices such as smartphones and tablet computers seem to be everywhere these days. The global market for the portable electronic device market continues to grow astronomically as, for example, more people turn in basic phones that lack the ability to download applications (i.e., "apps") and connect to the Internet for devices with advanced features. Today's advanced portable electronic devices can run a rich variety of third-party apps. There are hundreds and thousands of apps for both work and play. For example, the Android Market boasts over 100,000 apps available for download, with many more apps being added each and every day. In almost all cases, there is an app for whatever one can think of from recipes to sports to travel to games.

A person's smartphone is often a vital part of daily life. People rely on their smartphones for so much—e-mail, texting, social networking, "cool" apps, banking, shopping, and much more. A phone can hold lots of personal information, connect to various mobile networks, and can even do financial transactions. As use of the phone increases, so does its value to attackers. People desire to protect their phone from a variety of threats such as mobile malware, Trojans, worms, attempts to steal private data, apps that crash the operating system, and apps that drain the battery—just to name a few examples.

Malicious websites can exploit the phone or other mobile or portable electronic device through a web browser or may convince a user to download a malicious application; phishing sites can deceive a user and convince them to reveal login credentials or other sensitive data. A user can encounter a malicious page via a link in an e-mail message, an SMS or MMS message, a website (all types of sites, including search engines, social networking sites, and content sites), or a mobile application. Malicious content or functionality may also appear on a normally benevolent website.

In addition to protecting people from undesirable events it is also desirable to provide people with a good user experience. Generally, people desire systems and techniques that offer fast response times. As more and more people acquire network-enabled devices, such as smartphones, and access a network, such as the Internet, there is an increasing amount of network traffic. This can lead to long response times and many frustrated users. For example, when a user attempts to connect to a website, there are a number of processes and transactions that occur and which take time—time that can turn a productive experience into a frustrating experience.

Therefore, it is desirable to provide systems and techniques to identify and block threats. It is desirable to provide systems and techniques to enhance user experience.

BRIEF DESCRIPTION OF THE FIGURES

This disclosure is illustrated by way of example and not limitation in the figures of the accompanying drawings, in which like references indicate similar elements, and in which:

FIG. 11 shows an example of identifier categories.

DETAILED DESCRIPTION

This disclosure contemplates at least two discrete embodiments for mobile web protection. A first embodiment is directed to a server assessment, i.e., an assessment that is performed on a server. A second embodiment is directed to a client assessment, i.e., an assessment that is performed on a client.

Figure 1:
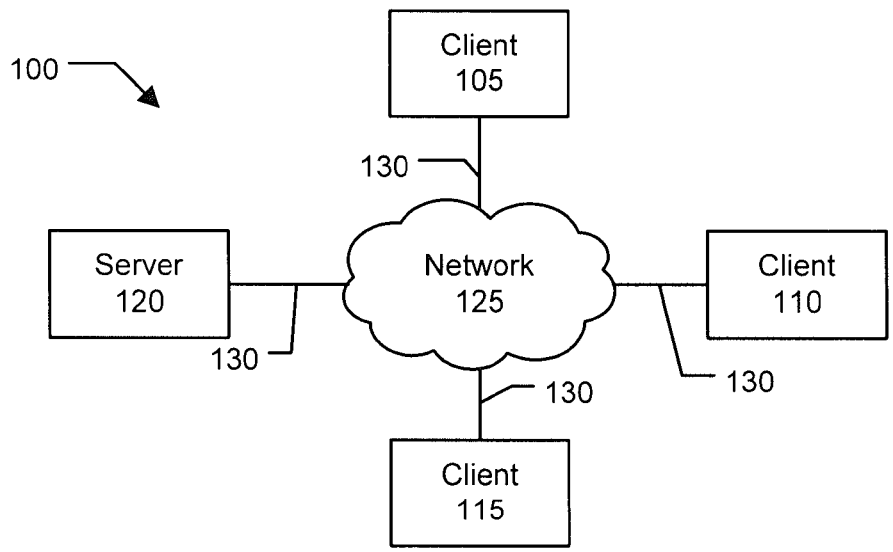
FIG. 1 shows a simplified block diagram of a mobile web protection system implemented in a distributed computing network connecting a server and clients.

FIG. 1 is a simplified block diagram of a distributed computer network 100 incorporating an embodiment of the present invention. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the invention may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 2:
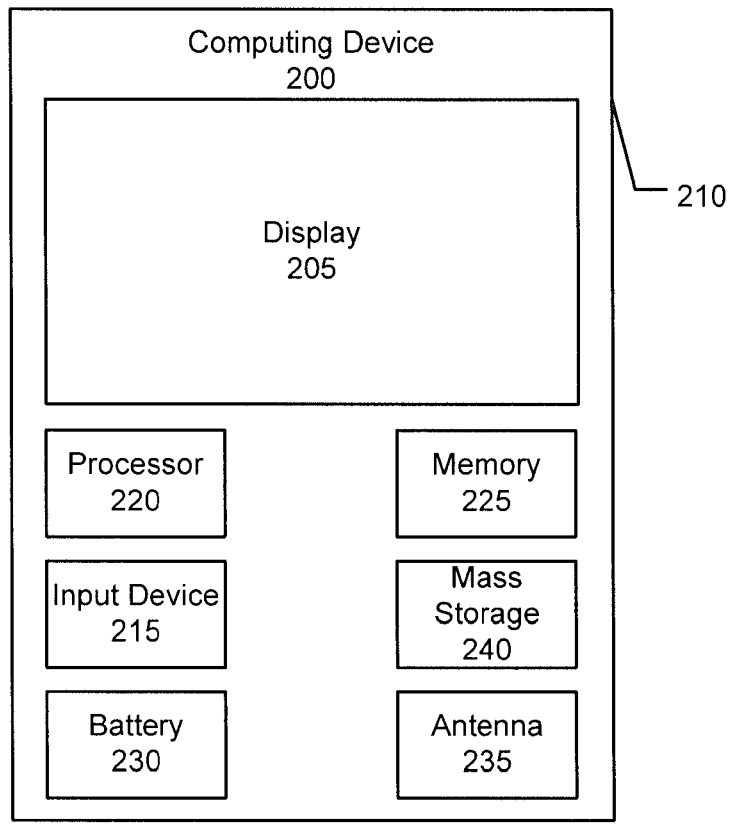
FIG. 2 shows a more detailed diagram of an exemplary client of the mobile web protection system.

FIG. 2 shows an exemplary computer system such as a client system of the present invention. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use with the present invention. Other configurations of subsystems suitable for use with the present invention will be readily apparent to one of ordinary skill in the art. For example, in a specific implementation, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from Math Works, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the invention using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 4:
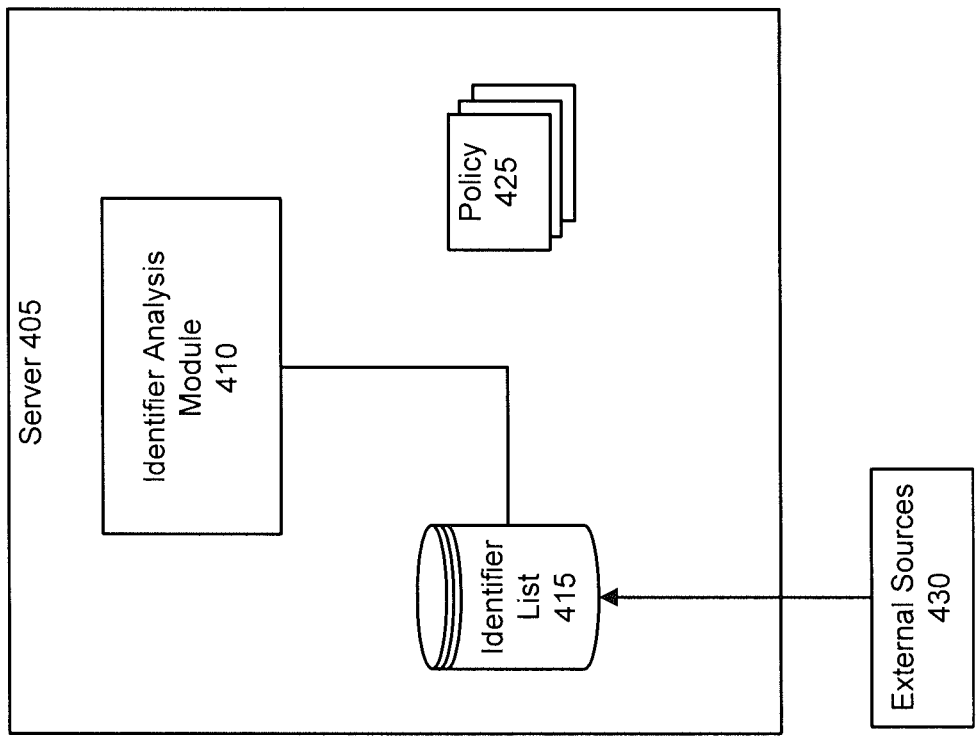
FIG. 4 shows a block diagram of an exemplary server of the mobile web protection system.
Figure 3:
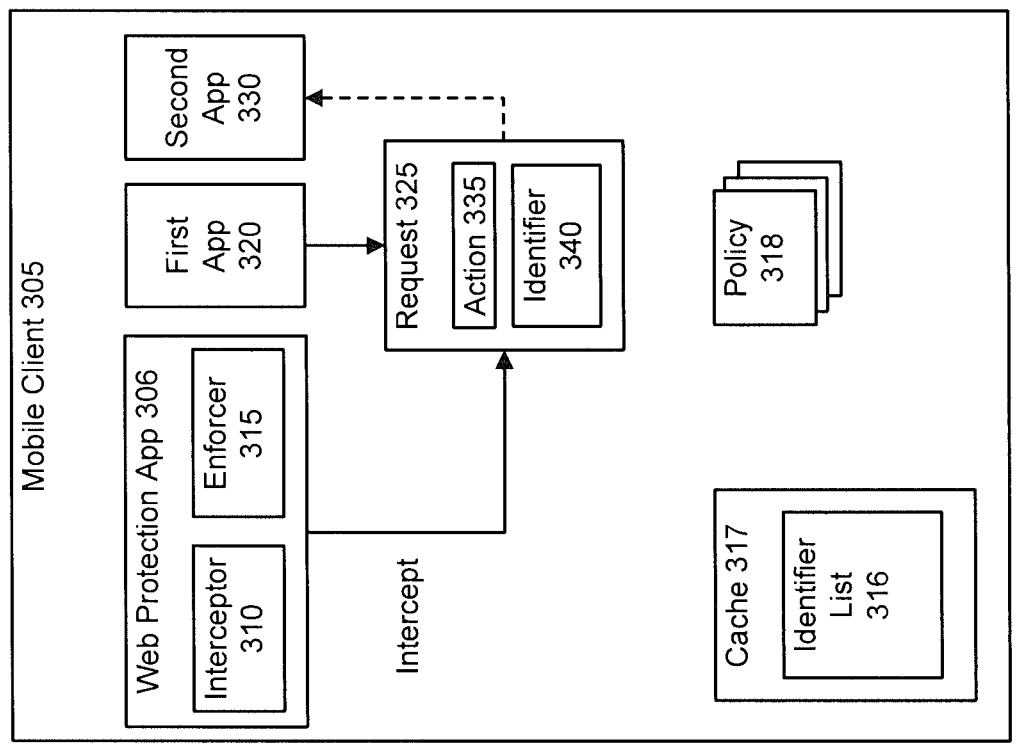
FIG. 3 shows a block diagram of an exemplary client of the mobile web protection system used to execute application programs such as a mobile web protection application, a web browser, a phone dialer program, and others.

FIGS. 3-4 show a block diagram of components of a mobile web protection system. Specifically, FIG. 3 shows a block diagram of protection components on a mobile client device 305. As shown in the example of FIG. 3, this mobile client includes a web protection application 306 which includes an interceptor module 310 and an enforcer module 315. The web protection application may be referred to as a safe-browsing application. In a specific implementation, the mobile client further includes a client-side list of identifiers 316 that are stored in memory 317, one or more identifier policies 318, or both.

FIG. 4 shows a block diagram of protection components on a server 405. As shown in the example of FIG. 4, this server includes an analysis module 410 and a server-side list of identifiers 415. In a specific implementation, the server includes one or more identifier policies 425.

Generally, an identifier is a sequence or arrangement of one or more characters such as letters, numbers, symbols, or combinations of these which identify or refer to a specific resource or object, or a set of resources or objects. Some examples of an identifier and its associated resource include a universal resource locator and web page; an e-mail address and e-mail recipient; and a phone number and phone recipient (or subscriber). An identifier can include wild card characters such as "*" or "?" which to refer to one or more unspecified characters. Further discussion of identifiers is provided below.

Referring now to FIG. 3, the mobile client further includes one or more application programs such as a browser, phone dialer, text message (e.g., Short Message Service ("SMS") or Multimedia Messaging Service ("MMS")), e-mail, or maps program. Some specific examples of application programs that may be found on a mobile client include Bump®, Facebook®, Foursquare®, Geodelic®, Goggles, Layar®, and many others. These application programs may be downloaded from an online store or marketplace (e.g., Android Market or Apple App Store). When the application is installed on the device, an icon to the application is typically placed on the home screen or application menu of the device. The application can be accessed or launched by touching the icon on the screen. These application programs may be referred to as "apps." There are literally thousands of "apps" available with many more being developed every day. Categories of apps include business, games, entertainment, sports, education, medical, fitness, news, travel, photography, and many more. Some apps are free or without cost to the user while other apps must be purchased.

A mechanism of some mobile operating systems allows messages or communications to be sent between apps. Specifically, a first application program 320 generates or initiates a request 325 to be received by a second application program 330. The web protection application intercepts the request before it is received by the second application program. The request includes an action 335 to be performed by the second application program and an identifier 340 associated with the action.

For example, the identifier may include a universal resource locator (URL) and the action may include a command for the second application program (e.g., a browser program) to load the URL. In some cases, the action (e.g. load a URL) may be implicit in the request and not explicitly specified. As another example, the identifier may include an e-mail address and the action may include a command for the second application program (e.g., e-mail program) to send an e-mail to the e-mail address. As another example, the identifier may include a phone number and the action may include a command for the second application program (e.g., phone dialer program) to dial the phone number. As another example, the identifier may include a phone number and the action may include a command for the second application program (e.g., text message program) to send a text message (e.g. SMS or MMS message) to the phone number. In some cases, the request may cause a change in the user interface (e.g. load a URL), where in others, the action may be performed in the background without user awareness (e.g. send a text message with given content to a given recipient).

Although FIG. 3 shows the request being generated by the first application program for receipt by the second application program, it should be appreciated that the request may instead be intended to be received by the first application program. For example, the first application program may be a browser which displays a web page having a link. Clicking on the link results in a request for the browser to load a resource associated with the link. The request is intercepted by the web protection application before the browser loads the resource associated with the link.

According to one aspect, the system helps to protect the mobile device from receiving undesirable information associated with the identifier, from contacting an undesirable resource associated with the identifier, from sending information to an undesirable recipient associated with the identifier, or combinations of these. In a specific implementation, the web protection application intercepts the request (and, in particular, the identifier) for evaluation. Based on the evaluation, the intercepted request, or rather the action it would perform, is blocked or permitted. The action may be conditionally permitted (or conditionally blocked).

Figure 5:
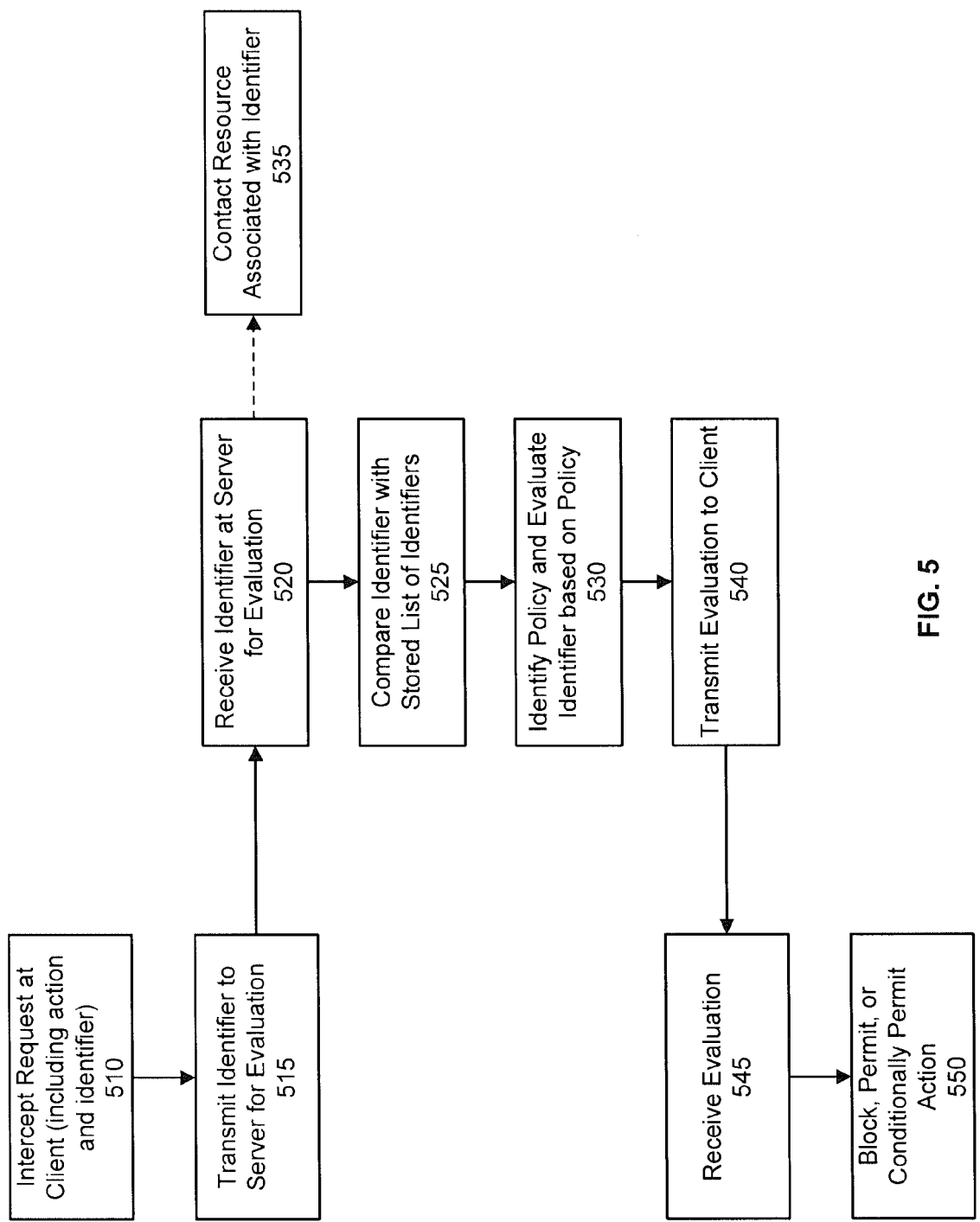
FIG. 5 shows a flow diagram of an intercepted identifier at the client being transmitted to a server for evaluation.
Figure 6:
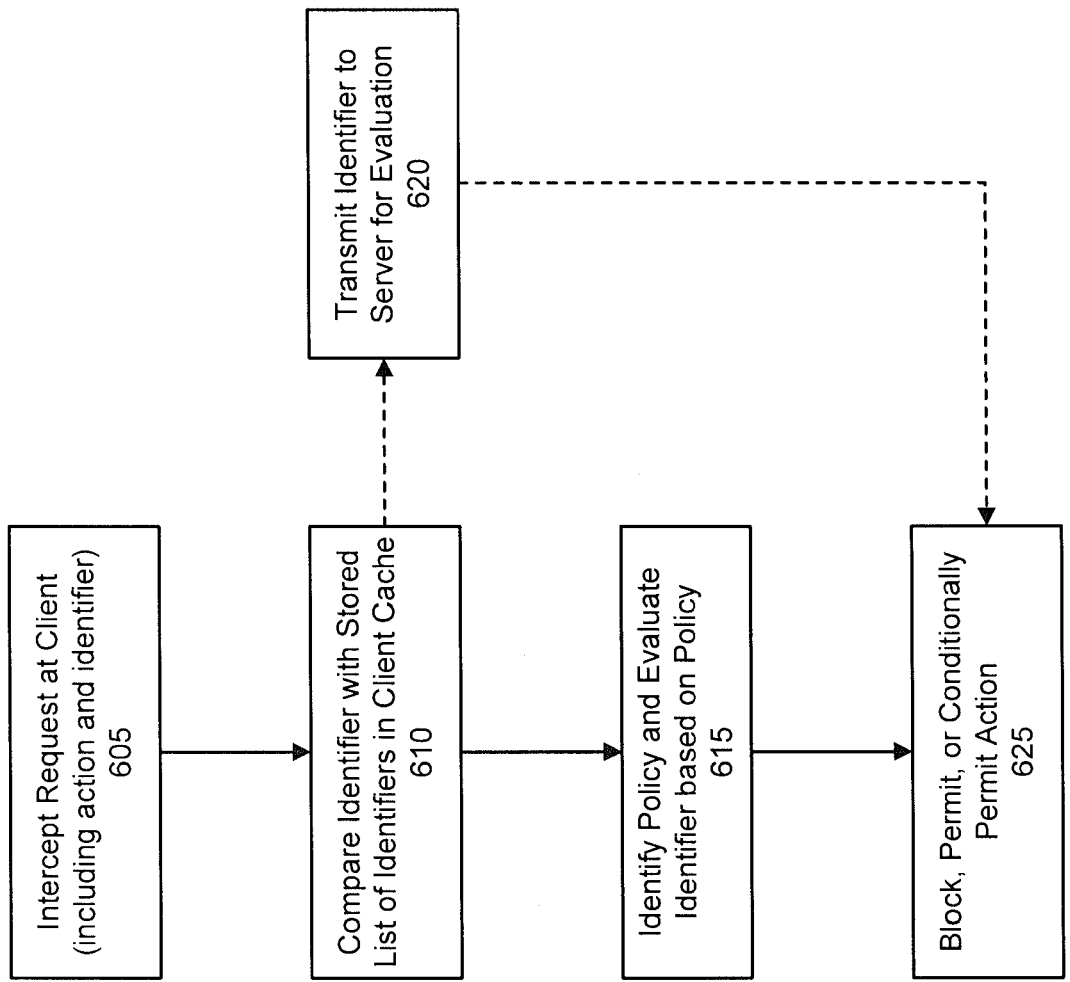
FIG. 6 shows a flow diagram of an intercepted identifier being evaluated at the client.

In a first embodiment, the identifier is transmitted from the client to the server to be evaluated at the server as shown in FIG. 5. In a second embodiment, the identifier is evaluated at the client as shown in FIG. 6. If the client is unable to evaluate the identifier, the identifier may be transmitted to the server for evaluation.

Server Assessment

FIG. 5 shows a flow of a specific implementation where an intercepted identifier at the mobile client is transmitted to a server for evaluation. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 510, request 325 (FIG. 3) from the first application program on the mobile device is intercepted by the interceptor module. More particularly, the interceptor module intercepts the request including the identifier and action originating from the first application program that is intended to be received by the second application program. In other words, the interceptor module intercepts the request before the request is received by the second application program. The interceptor module extracts or otherwise identifies or locates the identifier in the intercepted request.

A specific identifier may be, as noted above, a URL (e.g., http://www.urlexample.com) or Uniform Resource Identifier ("URI"). A URI is a string of characters used to identify a name or a resource on the Internet. A URL is a type or subset of the URI protocols or schemes. The URI protocols include "http," "ftp," and "mailto." A URI is a means to access a resource on a network (e.g., Internet) and designates a method to access the resource and the specific resource to be accessed. An "http" URI is typically referred to as a URL. A URI or URL typically includes several parts including a protocol and host name (including domain name and top-level domain). Directories and files may also be included.

For example, for the URL "http://wolfden.examples.com/main/about.jsp," the protocol is "http," the name of the server, or host name, is "wolfden.examples.com," and the domain is "examples.com," where the top-level domain is ".com." Some other top-level domains include: ".biz" and ".com" for commercial entities, ".edu" for educational institutions, ".gov" for U.S. governmental agencies, ".mobi" for mobile-compatible sites, ".net," ".org," and ".xxx" for sites providing sexually-explicit content or pornography. There may also be country code top-level domains such as ".be" for Belgium, ".ca" for Canada, ".de" for Germany, and many others. This example of the URL further specifies the path "main/about.jsp." This path may refer to a directory named "main" and a file inside that directory named "about.jsp." More particularly, the file has the filename or basename "about" and an extension "jsp." The extension typically specifies the type or format of the file. For example, ".jsp" refers to a Java Server Page. Some other examples of file extensions include ".pdf" for Portable Document File, ".php" for Personal Home Page (a scripting language), ".html" for Hypertext Markup Language, and many others. Alternatively, the path may refer to a programmatically parsed route rather than a particular file (e.g., "company/jobs").

A specific identifier may instead be a phone number. Phone numbers subject to the North American Numbering Plan (NANP), such as in the U.S., have a fixed-length of a ten digits while phone numbers in Europe, for example, are often variable in length, ranging from five or six digits in small towns to ten or more in large cities. The parts of a NANP phone number include a 3-digit area code, a 3-digit central office code, and a 4-digit subscriber number.

The area code designates a specific geographic region, such as a city or part of a state. The prefix originally referred to the specific switch that a phone line connected to. With the arrival of computerized switches, many systems now allow local number portability (LNP). The line number is the number assigned at the switch level to the phone line being used. A phone number may include a country code (e.g., "1" for U.S. and Canada, "45" for Denmark, "30" for Greece, and so forth). Generally, to make calls to other countries an international access code, the number "011" in the U.S., is first dialed followed by the country code. Some countries also have city codes.

The E.164 Number Mapping ("ENUM") standard provides a framework for every country to create its own international phone numbers. The standard specifies a maximum of 15 digits and the telephone number includes several parts. The first part is the country code (one to three digits). The second part is the national destination code ("NDC"). The last part is the subscriber number ("SN"). The NDC and SN together are collectively called the national (significant) number.

A specific identifier may instead be an e-mail address such as john@example.com. E-mail addresses generally include two parts. The first part (before the "@" symbol) is typically referred to as the local-part of the address and specifies the username of the recipient (e.g., "john"). The second part (after the "@" symbol) is typically referred to as the domain name to which the e-mail message will be sent (e.g., "example.com"). Some e-mail providers may provide additional processing on an e-mail address such as ignoring any periods, '.' characters, in the username (e.g. jo.hn@example.com is the same as john@example.com) or stripping any characters after a plus sign, '+' character, in the username (e.g. john+smith@example.com is the same as john@example.com).

As phone numbers and e-mail addresses may be in different formats when intercepted, such as a phone number that does not include an international prefix or an e-mail address that contains characters that will be stripped out during processing, in an embodiment, an identifier is normalized to a standardized form before further processing. For example, the normalization may utilize mobile network information of a mobile device to determine what country code to append to an incomplete phone number intercepted on the mobile device.

As an example, the intercepted phone number "5554321" may be normalized as "14155554321" where the country code "1" and area code "415" has been added to the beginning of the phone number. In a specific embodiment, there is a normalization table for providing a normalized identifier. The normalization table includes first and second columns. The first column lists non-normalized or incomplete identifiers which may be intercepted on the mobile device. The second column lists the corresponding normalized identifier. Thus, an entry or row in the table may include the non-normalized phone number "5554321" in the first column and the corresponding normalized phone number "14155554321" in the second column. The normalization process includes scanning the first column to find a match for the intercepted non-normalized identifier and upon finding a match, identifying the corresponding normalized identifier, i.e., "14155554321".

The normalization table can include wildcard characters. For example, an entry in the table may include the non-normalized phone number "555432?" in the first column and the corresponding normalized phone number "1415555432?" in the second column. The wildcard character "?" can represent a 0, 1, 2, 3, 4, 5, 6, 7, 8, or 9. The inclusion of the wildcard character in the second column indicates that the character in the normalized identifier should match the character in the intercepted identifier. Thus, this single entry in the table can provide a normalization of the intercepted phone number "5554321" as "14155554321," "5554322" as "14155554322," "5554323" as "14155554323," and so forth. The technique discussed above is merely one example of a technique to normalize an identifier and it should be appreciated that other normalization techniques may be used in other embodiments.

In a step 515 the web protection application transmits or sends the intercepted identifier from the client to server for evaluation. In a specific implementation, the transmitted intercepted identifier includes the complete URI (or URL), phone number, or e-mail address.

In another specific implementation, the transmitted identifier includes a part or portion of the intercepted identifier (e.g., URI, phone number, or e-mail address) and other parts or portions of the intercepted identifier are not transmitted from the client to the server. Transmitting a portion of the intercepted identifier instead of the entire identifier can help to reduce network traffic and decrease latency by increasing the breadth of the evaluation received from the server. In other words, in some cases it is desirable to make decisions based on, for example, the rating of the domain name component of the intercepted URL, rather than the entire URL. This can help to reduce the number of entries and can provide broad assessments for caching. For example, instead of transmitting a full URL which corresponds to a single web page, just the domain name can be transmitted in order for the evaluation received from the server to correspond to all pages accessible via that domain, thereby allowing subsequent intercepted identifiers for pages on that domain to be evaluated from a cache on the device rather than requiring an evaluation from the server. Caching is described further below.

For example, in various implementations, with reference to URIs or URLs, the domain name (e.g., "examples.com") is transmitted, the host name (e.g., "wolfden.examples.com") is transmitted, or the domain name with the top-level domain (e.g., ".com") omitted is transmitted (e.g. "examples"). Alternatively, the host name is not transmitted and the top-level domain is transmitted. As another example, with reference to NANP phone numbers, the area code of a phone number is transmitted, but the central office code, subscriber number, or both are not transmitted. The international access code, country code, or both is transmitted, but the area code, central office code, and subscriber number are not transmitted. As another example, with reference to e-mail addresses, the domain name to which the e-mail message will be sent is transmitted to the server and the username of the recipient is not transmitted. Alternatively, the username is transmitted and the domain name is not transmitted.

In a step 520, the intercepted identifier is received at the server by analysis module 410 (FIG. 4). In a step 525, the system compares the intercepted identifier with list of identifiers 415. In a specific implementation, each identifier in list of identifiers 415 is associated with at least one category. An identifier may be associated with a subcategory within a category. There can be any number of subcategory levels. In an embodiment, the comparison can be either an exact match (i.e., the intercepted identifier is the same as an entry in the list) or a partial match, where the intercepted identifier corresponds to an entry in the list, but that entry does not exactly match the intercepted identifier. For example, if the intercepted identifier is a URL (e.g. "http://www.example.com/a/b/c.html"), then if the full URL may be present in the list there is an exact match; however, if that exact URL is not present in the list, there may be a partial match such as the case where the domain name (e.g. "example.com"), host name (e.g. "www.example.com"), top-level domain (e.g. ".com"), or partial URL (e.g. http://www.example.com/a/b) is in the list.

In the case of a partial match, the evaluation may proceed based on the partially matched identifier in the list, thus the partially matched identifier's category being used for the intercepted identifier. For example, in the case of a phone number, the intercepted identifier may be a full phone number (e.g., "+234 805 300 6213") with the list of identifiers containing a partial phone number (e.g., "+234 805 300") so that the partial phone number's category is used to evaluate the intercepted phone number. In an embodiment, multiple identifiers in the list partially match the intercepted identifier (e.g., ".com", "blog.com", and "www.blog.com"). In this case, the server may use the most specific identifier that matches a given intercepted identifier in order to provide the most accurate categorization for a given intercepted identifier. For example, there may be a variety of different types of pages hosted on all sites with the "blog.com" domain, so it is important that "pornography.blog.com" has the capability to be categorized separately from "news.blog.com" while maintaining the ability to have an overall "blog.com" categorization for URLs that do not have a more specific entry in the list.

Figure 10:
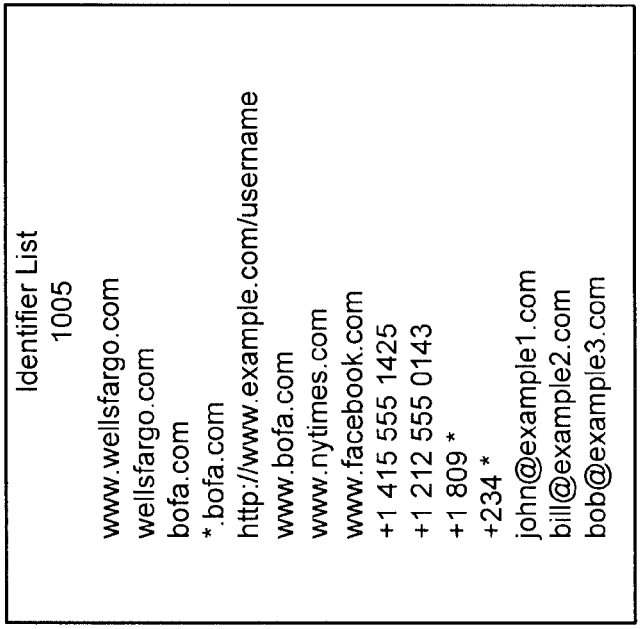
FIG. 10 shows an example of an identifier list.

Thus, in a specific embodiment, a technique for identifying a category associated with an intercepted identifier (e.g., identifier 340, FIG. 3) includes scanning the identifier list (e.g., identifier list 1005, FIG. 10). Determining that the intercepted identifier matches a first identifier in the list, the first identifier being associated with a first category (see FIG. 11). Determining that the intercepted identifier partially matches a second identifier in the list associated, the second identifier being associated with a second category, different from the first category. Based on the intercepted identifier matching the first identifier in the list, associating the intercepted identifier with the first category.

In an embodiment, if an intercepted identifier (e.g., identifier 340, FIG. 3) can match multiple types of identifiers in the list (e.g., domain name, server name, or URL), then the determination of any matching identifier in the list proceeds from the most specific type of identifier to the least specific type of identifier. For example, the full URL of the intercepted identifier may be compared to full URLs in a list. If no full URL match is found, then a list of partial URLs may be compared against the intercepted identifier. For example a partial URL "http://www.malware.com/exploits" in a list would match an intercepted identifier "http://www.malware.com/exploits/1.html." If no partial URL match is found, then the server name of the intercepted identifier is compared to a list of server names. If no server name match is found, then the domain name of the intercepted identifier is compared to a list of domain names. In such an embodiment, broad categorizations (e.g., domain name) can be used to maximize coverage while preserving the ability to provide targeted categorization and various levels of specificity (e.g., full or partial URL match).

More particularly, in a specific implementation, a list of identifiers is arranged or organized as a hierarchical structure (e.g., tree structure) or as a taxonomy of identifiers. In this specific implementation, nodes in the tree correspond to the identifiers and represent various levels of abstraction or specificity. Identifiers in the lower level nodes are more specific than identifiers in the higher level nodes. There can be a top level node and a bottom level node, or one or more nodes between the top and bottom level nodes. A top level node may be referred to as a root node. A bottom level node may be referred to as a terminal node. Each node is associated with a category. In a specific implementation, the tree is traversed to find that node corresponding to an identifier which most closely matches the intercepted identifier and selecting the category associated with that node.

For example, in the case of URIs, there can be a first level node corresponding to a domain identifier and associated with a first category, a second level node corresponding to a server name identifier and associated with a second category, and a third level node corresponding to a full URL identifier and associated with a third category. Generally, the domain is considered to be less specific than the server name, and the server name is considered to be less specific than the full URL. Thus, the second level node is below the first level node and above the third level node. In other words, the second level node is between the first and second level nodes. In a first pass, an intercepted URI identifier (e.g., identifier 340, FIG. 3) is compared with the full URL identifier of the third level node. If there is a match, then the third category is selected. If there is no match, then a second pass is performed. In the second pass, the intercepted URI identifier is compared with the server name identifier of the second level node. If there is a match, then the second category is selected. If there is no match, then a third pass is performed. In the third pass, the intercepted URI identifier is compared with the domain identifier of the first level node. If there is a match, then the third category is selected.

The example above included searching through a three-level tree. It should be appreciated, however, that a tree can have any number of levels, e.g., one, two, three, four, five, or more than five levels. The relationship between nodes of different levels may be referred to as supertype-subtype, generalization-specialization, or parent-child. In this specific implementation, if there is a match between, for example, the child-level identifier and intercepted identifier and a partial match (or inexact or broad match) between the parent-level identifier and the intercepted identifier, the category associated with the child-level identifier is selected rather than the category associated with the parent-level identifier. In another specific implementation, the category associated with the parent-level identifier is selected.

In another specific embodiment, a technique for identifying a category (see FIG. 11) associated with an intercepted identifier (e.g., identifier 340, FIG. 3) includes scanning the identifier list (e.g., identifier list 1005, FIG. 10). Determining that a first sequence of characters of the intercepted identifier matches a first identifier in the list, the first identifier being associated with a first category. Determining that a second sequence of characters of the intercepted identifier matches a second identifier in the list, the second identifier being associated with a second category, different from the first category. If a number of characters in the first sequence is greater than a number of characters in the second sequence, associating the intercepted identifier with the first category. If the number of characters in the second sequence is greater than the number of characters in the first sequence, associating the intercepted identifier with the second category.

FIG. 11 shows an example of categories, sub-categories, and sub-sub-categories that an identifier may be associated with. As shown in FIG. 11, some specific examples of categories include adult materials, business/services, communication, criminal activities, education, entertainment, games, health, information technology, lifestyle, miscellaneous, news, politics/religion/law, search engines, security, and shopping. Some specific examples of subcategories, such as the subcategory for adult materials, include child inappropriate, nudity, pornography, and profanity. In a specific implementation, the system imports or downloads categorized lists of identifiers from one or more external sources 430 (FIG. 4) such as Google, OpenDNS, or zVelo. The system can then aggregate the list into a single list of identifiers. In other words, rather than relying on a single list of bad URIs, the server can aggregate multiple sources to create a single list. For example, Google and OpenDNS offer free lists of bad URIs that can be periodically downloaded to a server. In these cases, the system server may not have to visit and examine each link to determine its safety.

In a specific implementation, the category labels shown in FIG. 11 apply to URIs. The URI can be a complete URL, e.g., "http://www.wellsfargo.com" that may be associated with the category label "Finance→Banking." Alternatively, the URI can be a portion of a URL, e.g., ".xxx" that may be associated with the category "Adult Materials." In another specific implementation, the category labels are applied to phone numbers, e-mail addresses, portions of phone numbers, portions of e-mail addresses, or both, e.g., "(555) 555-5555" may be associated with the category "Business/Services," the e-mail address "ex@example.com" may be associated with the category "News."

A list of categorized identifiers can include any combination of URIs, phone numbers, e-mail addresses, or domain names. For example, as shown in FIG. 10, a single list of categorized identifiers may include URIs and URI patterns, phone numbers, e-mail addresses, domain names, and host names. Alternatively, there can multiple lists of categorized identifiers based on type of identifier, e.g., URI, phone number, domain name, or e-mail address. Specifically, a first list of categorized identifiers may include URIs. A second list of categorized identifiers may include phone numbers. A third list of categorized identifiers may include e-mail addresses. A fourth list of categorized identifiers may include domain names.

Referring now to FIG. 5, in a step 530, in a specific implementation, the system identifies a policy corresponding to the category associated with the intercepted identifier. The system evaluates the policy to determine whether the action should be, for example, blocked, permitted, or conditionally permitted. There can be an adult material policy which is evaluated when the intercepted identifier falls under the adult material category. For example, the intercepted identifier may be the top-level domain ".xxx" which is categorized as adult material. This categorization would trigger an evaluation of the adult material policy. The policy may include a broad condition that adult material is to be blocked, or that adult material should be conditionally permitted after warning the user. In an embodiment, a policy will express some sort of conditions or logic to determine an evaluation for an intercepted identifier. A policy may simply include an action to be taken for particular categorizations or may be more in-depth to examine multiple factors such as configuration settings for the particular device requesting the evaluation. Such configuration settings for the mobile device may be transmitted from the mobile device to the server along with the intercepted identifier. Alternatively, the configuration settings may be transmitted in response to the server requesting the mobile device to transmit the configuration settings. For example, the policy may include a programmatic expression to be evaluated, a conditional statement (e.g., if X then do Y else do Z), boolean operators (e.g., OR, AND, or NOT), or combinations of these.

Alternatively, the policy may be more granular. The policy may specify certain conditions or restrictions. An adult-material policy condition may allow access to sites classified as "R-Rated," but block access to sites classified as "Pornography." As another example, a policy may specify that access to sites classified as "Profanity" is permitted, but access to sites classified as "Pornography" is not permitted.

In a specific implementation, the policy is evaluated entirely at the server so the evaluation transmitted to the client specifies a specific action to be taken. For example, the server may store configuration settings for the clients that specify which categories are allowed and disallowed. In another specific implementation, the categorization of the intercepted identifier is transmitted to the client and policy is evaluated on the client to determine what action to take. For example, the client may store configuration that determine what categories of identifier to block, permit, and conditionally permit or may evaluate the categorization in the context of the device state (e.g., type of network connected to, battery level) or service state (e.g., data plan usage).

In other words, in a specific implementation, the decision of how to act is partially based on the categorization of the intercepted identifier (e.g., identifier 340, FIG. 3) and is partially based on the state or state information of the mobile device which can vary or be different based on the specific mobile device. State information may include information such as battery (e.g., remaining battery level), type of network connection, storage capacity or space (e.g., amount of remaining or free storage capacity), or combinations of these. In a specific implementation, a method for policy evaluation includes providing a first intercepted request from a first mobile client and a second intercepted request from a second mobile client, where each of the requests specify an identifier (e.g., identifier 340, FIG. 3). The method includes determining that the identifier is associated with a category, evaluating a policy to determine whether the first intercepted request should be permitted, blocked, or conditionally permitted based on the category and first state information associated with the first mobile client. The method includes determining that the first intercepted request should be one of permitted, blocked, or conditionally permitted.

The method further includes evaluating the policy (i.e., the same policy) to determine whether the second intercepted request should be permitted, blocked, or conditionally permitted based on the category and second state information, different from the first state information, associated with the second mobile client. The method includes determining that the second intercepted request should be another of permitted, blocked, or conditionally permitted, different from the one of permitted, blocked, or conditionally permitted of the first intercepted request. The first state information may include an indication of first remaining battery level of the first mobile client. The second state information may include an indication of second remaining battery level of the second mobile client, different from the first remaining battery level. The first state information may include an indication of a first network connection type used by the first mobile client. The second state information may include an indication of a second network connection type used by the second mobile client, different from the first network connection type. The first state information may include an indication of first remaining storage capacity of the first mobile client. The second state information may include an indication of second remaining storage capacity of the second mobile client, different from the first remaining storage capacity.

The policies discussed above help to ensure that content on the mobile device will be suitable for a particular user, e.g., child versus adult. These policies may be referred to as thematic or content-based policies. However, there can also be operations-based policies.

For example, in a specific implementation, there is a battery-preservation policy. In this specific implementation, certain identifiers are categorized as having high-battery usage requirements. For example, an intercepted URI may point to streaming videos or other battery-intensive resources where, for example, loading the video could quickly deplete the battery. In this specific implementation, the battery-consumption policy includes a condition that the user is to be warned that the resource they are about to access is very battery-intensive. The user is given an option to continue accessing the resource or cancel. Thus, evaluating a policy leads to an action or recommendation, e.g., a recommendation that the user should use caution in loading the video because playing the video will quickly deplete the battery. A policy may include a default such that the default is no access to battery-intensive resources unless the user explicitly consents to accessing the resource. In a specific implementation, the battery-preservation policy is evaluated on the client and the action or recommendation decision is based on the state of the device (e.g., its current battery level). For example, the device may only alert about visiting a battery-intensive resource if the current battery is low, but not alert of the battery is full or the device is plugged in.

In another specific implementation, there is a cost-reduction policy. In this specific implementation, certain identifiers are categorized as being associated with additional fees, charges, or monetary costs to the mobile device user from the application provider, the service carrier, or even a combination of both. For example, an intercepted phone number identifier transmitted to the server may include the international access code, "011" which indicates that a call to another country is about to be made. Such an international call may result in additional charges being billed to the user. Thus, the policy may include a condition to warn the user that an international call is about to be made which will result in additional charges. The user is given an option to continue with the call or cancel the call. In a specific implementation, any action that could cost the user money, such as sending an SMS, initiating a phone call, or loading a web page is intercepted and stopped if that action would cause the user to exceed the limitations of their mobile service plan and incur additional charges.

In an embodiment, information about the user's service plan is retrieved from their network operator. For example, the network operator may expose an API by which service plan data, such as total plan limits and current usage can be retrieved. In another example, the network operator may have a web page that displays service plan data and a scraping module extracts the service plan data from that web page. A network operator's API or web service may require the user to supply access credentials for access to service plan data. In an embodiment, a policy may specify that access is determined based on actual usage (e.g., if actual usage is greater than X, then alert a user) and the device maintains meters of actual usage to appropriately act upon the policy.

For example, mobile device service plans typically have a monthly base price and usage limit. As long as the user's activity is below the usage limit, there is no additional charge. If, however, the user's activity exceeds the usage limit, additional charges apply. Usage may refer to data usage and be based on the amount of data (e.g., gigabytes) sent and received. Usage may refer to phone calls and be based on the amount of time (e.g., minutes) spent talking. Usage may refer to text messages and be based on the number of text messages sent and received. For example, a monthly base price of Y dollars may allow up to Z text messages to be sent. Each text message sent after Z text messages may cost M dollars. In this embodiment, a policy evaluation includes identifying a user's usage limit and current usage, determining that permitting the intercepted request would result in a first usage. And, if the first usage plus the current usage is greater than the usage limit, alert the user. In this embodiment, depending on how the current usage data is gathered, such a policy may be evaluated at the device or the server.

Another policy would be to provide notice of potential high costs without regard to a user's specific policy. In other words, there may be a policy to alert in all cases and the user can override the alert if the alert is not applicable or if the consequence is known and accepted by the user.

Any number of policies may be analyzed during evaluation of the intercepted identifier. Further, the evaluation may include other criteria or factors such as type of network connection. In this specific implementation, when a user is connected to a network using an insecure connection, and the user attempts to load certain sensitive web pages, a warning, i.e., insecure network warning is displayed.

For example, a user on an unsecured WiFi connection who attempts to load the login page on a bank website may see a popup warning them about the risks and encouraging them to switch to a more secure network connection. In other words, the system recognizes unsecured networks and the URI checking service can categorize URIs as belonging to a bank, social network, e-mail service, and so forth.

In this specific implementation, a set of categories are classified as "data sensitive." Examples of data sensitive URIs include login screens, social networking sites (e.g., Facebook), banking sites (e.g., wellsfargo.com or bofa.com). In this specific implementation, if the user is on an unsecured network connection, they are warned about the risks of opening these pages before the page loads. The user may also be given the option to switch to a more secure connection if the system detects that one is available. In an embodiment, the protocol being used to access content is also used as part of policy evaluation. For example, if a user on an unsecured Wi-Fi connection accesses a data sensitive web page via an unencrypted protocol (e.g., "http"), then the policy indicates a warning; however, if the user visits the same web page via an encrypted protocol (e.g., "https"), then the policy will not warn the user.

In some cases, the server may receive an identifier that the system does not find in its stored list of categorized identifiers. In these cases, if the system determines that the intercepted identifier is not listed in the stored list of categorized identifiers, i.e., the identifier is not known by the database, the system contacts the resource associated with the identifier (step 535). If the intercepted identifier is a URI, the analysis module visits the resource (e.g., web page) identified by the URI. The module performs an analysis on the web page contents. The result of the analysis can be a determination of what category or set of categories the intercepted identifier should be classified under or can be a determination of whether or not the resource is safe. The result of the analysis may be referred to as an assessment.

Sometimes malicious sites use techniques to detect the type of device visiting the site in order to deliver targeted exploits or malware that can affect the visiting device. For example, a site may be harmless when visited by a desktop browser, but configured to deliver different malicious content to a mobile phone browser. Thus, to address this issue, the analysis module may send a user-agent for a mobile device operating system or browser when retrieving the link (or URI) under analysis. The result of the analysis can determine the risk for a particular device. In other words, the system visits the site and simulates a mobile device browser to detect malicious behavior (e.g., downloads or exploitation). The analysis module may alternatively use a mobile device emulator to visit the site in a native browser, detecting any undesirable changes to the emulator (e.g., exploitation, application downloads, crashes) as a result of visiting the URI. The analysis by the emulator may be referred to as a dynamic analysis. Further details of analyses are provided in U.S. patent application Ser. Nos. 12/868,669; 12/868,672; and 12/868,676, all filed Aug. 25, 2010, and which are herein incorporated by reference along with all other references cited.

In a specific implementation, the system classifies URIs based on links to mobile malware. By examining the contents of a web page, the system can determine whether the page links to any mobile applications. For example, the system may find malicious mobile applications, such as malicious Android apps, iPhone apps, or both. Android apps may be identified by an ".apk" file extension which refers to an Android Package (APK) file. Android apps may be referred to as APKs. iPhone apps may be identified by an ".ipa" file extension, which refers to an iPhone application package (IPA) file.

A page may be examined in order to determine whether it links to iPhone or Android apps by looking for links including ".apk" or ".ipa" file extensions. Alternatively, the system may visit links on the page and determine whether the response from the server hosting the link returns an Android or iPhone application for download.

Some techniques for identifying the type of file being downloaded include examining the HTTP headers for the filename of the download specified by the server (e.g., do the headers specify an .ipa or .apk extension), examining the HTTP headers for a particular Multipurpose Internet Mail Extensions ("MIME") type, or examining the data returned by the server for characteristics indicative of a mobile application such as the presence of a particular type of executable binary (e.g., ARM Mach-O binary, Dalvik classes file) in a downloadable archive.

One skilled in the art will recognize that a variety of additional techniques that can be used to determine whether data provided by a server contains a mobile application without departing from the scope of this disclosure. When a mobile application is detected in a link, the system can download the application and submit it to a scanning API or component which may be part of identifier analysis module 410 on server 405 (FIG. 4). The API can examine the application and render an assessment, including identification of apps that contain malware, spyware, or other undesirable elements. In a specific implementation, the system can change the assessment of the web page based on the contents of the mobile application (e.g., IPA, APK) file it links to. In this specific implementation, there is a web page having a first assessment (e.g., "safe"). The web page includes a link to a file having the file extension ".apk." The system analyzes the file. Based on the analysis, when appropriate, the system changes or updates its assessment of the web page to a second assessment (e.g., "unsafe"), different from the first assessment.

URI (or URL) shorteners can hide the destination of a link. To address this issue, the analysis module can communicate with the URL shortening service application programming interface ("API") to resolve the link if one is provided, or otherwise, follow the URL to determine the actual destination. For example, the website "http://bit.ly," provided by bitly, Inc. of New York City, N.Y. offers a free API that returns the destination URL.

In some cases there will be a large amount of analysis (e.g., deep content scanning) that could be done on a page and its associated functionality. This could involve a lengthy amount of time, such as a circumstance where an entire mobile application must be downloaded and analyzed or the page contains JavaScript that needs to be evaluated. So, in a specific implementation, the analysis module selects certain types of content to perform deep content scanning on so as not to perform unnecessary or undesired analysis for a given evaluation. For example, if a page contains a link to two mobile applications, one for Android and another for iPhone, and iPhone requested the evaluation of the URI, then the analysis module may choose to skip scanning the Android application and only scan the iPhone application to return an evaluation more quickly.

In another example, if a page contains JavaScript, the static HTML content may be scanned to return an evaluation, with the JavaScript being scanned at a later time. Other types of content that may be initially skipped to return an evaluation quickly include (but are not limited to) images, PDF documents, Flash applications, mouse pointers, fonts, audio files, video files. Thus, the system may allow the client to follow the URI, but push a real-time alert to the client if the URI is later determined to be bad after further analysis so that retroactive action may be taken. In an embodiment, the reputation of the site may be used to determine whether to return an evaluation before deep content analysis is complete. For example, if the page is on a domain that has never hosted malware before, deep content scanning may be skipped; however, if the page is on a domain that frequently hosts malware, deep content scanning may be required to return an evaluation. Analysis actions that have been skipped to return an evaluation more quickly may be performed after returning the evaluation so that a full evaluation of the page is ready next time the page is to be evaluated.

Thus, in a specific implementation, a technique for analyzing a resource (e.g., web page) identified by an intercepted identifier includes scanning at most a first portion of the resource. Based on the scanned first portion, making a first evaluation of the intercepted identifier and transmitting the first evaluation from the server to the client. After the transmitting the first evaluation, scanning a second portion of the resource. Based on the scanned second portion, making a second evaluation of the intercepted identifier, different from the first evaluation, and transmitting the second evaluation from the server to the client.

In a specific implementation, the system categorizes identifiers (e.g., URIs or URLs) instead of or in addition to importing or downloading categorized lists from third-party link checking services. (see, e.g., FIG. 11). In this specific implementation, the system maintains a list of identifiers, an assessment for each identifier, and periodically updates the assessment. In a specific implementation, the frequency of the periodic updates is based on a reputation score or rating. For example, in cases where the identifier identifies a website, the system stores a list of identifiers, each identifier identifying a website. Each identifier or website has a reputation score based on data the system knows about that site. Sites with a good reputation may be checked less often (and the cache for these sites may be updated less often). Sites with a poor reputation may be checked more thoroughly and more often.

For example, Table A below shows an example of a list of identifiers where each identifier has an assessment result, date and time of the assessment, and a reputation score.

TABLE A

| Identifier | Assessment | Date and Time of Assessment | Reputation Score |
|---|---|---|---|
| www.wellsfargo.com | Safe | Apr. 16, 2011, 5:00 PM | Good |
| www.youtube.com | Safe | Apr. 16, 2011, 5:30 PM | Poor |
| www.getrichnow.com | Unsafe | Apr. 16, 2011, 5:35 PM | Poor |

In this specific implementation, this list of identifiers is stored on server 405 (FIG. 4) and is periodically updated based on reputation score. In this example, the identifiers "wellsfargo" and "youtube" both have an assessment of "Safe." However, the reputation score for "wellsfargo" is "Good" whereas the reputation score for "youtube" is "Poor." Thus, the system will check the "youtube" site more often, more thoroughly, or both than the "wellsfargo" site. For example, the site "wellsfargo" may be checked once a week, but the site "youtube" may be checked once a day. The checking may include, as discussed above, scanning the "youtube" site to find links to certain files, such as Android apps, downloading the app, and examining the app for malware, spyware, or other undesirable elements. If, for example, the "youtube" site is determined to have malware, then the assessment result in the list of identifiers may be changed from "Safe" to "Unsafe."

Site reputation may be based on frequency of links to malicious sites. In other words, the site "getrichnow" in Table A above is classified as "Poor" because the site has many links to malicious sites (e.g., sites having malware or spyware). Similarly, app reputation may be based on frequency of links sourced from an application on a mobile device to malicious sites. In other words, an examination of the app or links originating from that app may reveal that the app includes many links to malicious sites. Thus, the app would be classified as "Poor." For example, an app providing links to pirated games is be considered to have a poor reputation if the links in that app often lead to malware; however, an app providing links to legitimate games that are infrequently malicious is considered to have a good reputation. Other examples of reputation criteria include whether or not malware was determined to have been downloaded from a URI. Based on malware being downloaded (or not) through that URI, that URI's reputation and other identifiers associated with that URI (e.g. domain name, host name) are affected.

The list of categories shown in FIG. 11 is merely an example of category labels and there can be other category labels, groups, and classifications, instead of or in addition to what is shown in FIG. 11. In a specific implementation, the set of categories from the assessment are mapped to a set of responses provided by the system, rather than requiring each individual identifier to have a separate response. In this specific implementation, there may be a top-level "malicious sites" category which includes from FIG. 11 the categories Botnet, Malware Call-Home, and Malware Distribution Point. The response includes blocking the page from loading. There may be a top-level "phishing" category and a set of categories will be classified as phishing or scam sites. The response includes preventing the pages from loading. There may be a top-level "risky" category where the web pages are not absolutely malicious, and the user would see a warning but the page would be allowed to load. In an embodiment, a given identifier may have its response overridden from the default specified by its categorization. For example, if the determination of a response based on categorization is accomplished by a policy, a policy that warns when visiting a top level category (e.g., "phishing") may be accompanied by a more granular policy that blocks more specific categories (e.g., "financial phishing") or that overrides the categorical policy for particular identifiers (e.g., allow all identifiers on a specific domain even if it is categorized as "financial phishing").

In a specific implementation, there is at most one category, i.e., a single category. In a specific implementation, the single category is a list of prohibited identifiers and the identifier list (e.g., identifier list 1005—FIG. 10) is referred to as a "blacklist." Identifiers listed in the blacklist are blocked and identifiers not listed in the blacklist are allowed. In another specific implementation, the single category is a list of allowed identifiers and the identifier list is referred to as a "whitelist." Only identifiers listed in the whitelist are allowed and identifiers not listed in the whitelist are blocked. In another specific implementation, the single category is a list of "risky" identifiers and the identifier list is referred to as a "graylist." Identifiers listed in the gray list are conditionally permitted, i.e., the system displays a warning message before permitting the user to continue.

Referring now to FIG. 5, in a step 540, the server evaluation is transmitted from the server to the mobile client device and received (step 545) at the mobile client device. The evaluation provides an indication for how the mobile client device should respond to the request. In a specific implementation, evaluation includes a simple "block" or "don't block." In another specific implementation, the evaluation includes instructions for how to respond (e.g., "warn" versus "block" versus "allow).

More particularly, in a step 550, enforcer module 315 (FIG. 3) can permit the intercepted request, block the intercepted request, or conditionally permit the intercepted request. In a specific implementation, permitting the intercepted request includes the web protection application passing the intercepted request along to the second application program by generating a second request including the action to be performed by the second application program and the identifier associated with the action. Because the web protection application may be desired to operate transparently, the second request may include all of the data specified in the first request by the application reusing the first request's data or duplicating the first request's data. The second requested is then received by the second application program, which can then, for example, load the web page specified by the identifier, call the phone number or send a text message specified by the identifier, or send an e-mail specified by the identifier.

Figure 8:
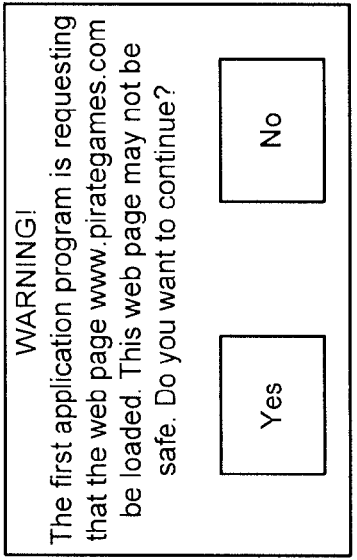
FIG. 8 shows an example of a notification message when an action has been blocked.

In this specific implementation, the act of blocking the intercepted request includes not passing the intercepted request along to the second application program by not generating the second request. When the intercepted request is blocked, the system can display a message or notification on the mobile device to inform the user that the request was blocked. An example message is shown in FIG. 8. FIG. 8 shows a dialog or pop-up box including text such as "SITE BLOCKED! The first application program's request to load the web page "www.example.xxx" has been blocked because the web page is unsafe." As shown in the example of FIG. 8, the dialog box includes a button (e.g., "OK") which the user can click to close the pop-up box after reading the message. Table B below provides some other examples of notification text that may be displayed when a request is blocked.

TABLE B

| Notification Text | Explanation |
| --- | --- |
| "The first application's request to call the phone number "1-900-555-5555" has been blocked." | A phone number having the form "1-900-###-####" may be referred to as a "900 number" or "one-nine-hundred." A call to a 1-900 number can result in a high per-minute or per-call charge. For example, a "psychic hotline" type of 1-900 number may charge $2.99 for the first minute and 99 cents for each additional minute. |
| "The first application's request to load the web page "www.example.com.ng" has been blocked." | The country code top-level domain ".ng" refers to the country Nigeria which has frequently been cited as a source of many fraudulent schemes such as advance-fee fraud. An advance-fee fraud is a confidence trick in which the target is persuaded to advance sums of money in the hope of realizing a significantly larger gain. |

TABLE B-continued

| Notification Text | Explanation |
| --- | --- |
| "The first application's request to call the phone number "809-555-5555" has been blocked because it is an international number." | Some phone numbers that seem like they are domestic will actually dial internationally. The 809 area code refers to the Dominican Republic and will result in a high per-minute charge. |

Alternatively, the enforcer module 315 (FIG. 3) may conditionally permit the intercepted request. In this specific implementation, conditionally permitting the intercepted request includes displaying warning message on the mobile device where the warning message includes a first option for the user to allow the request and a second option for the user to cancel the request. For example, the system may have determined that the intercepted identifier specifies a possibly unsafe web page, that the web page is not in compliance with one or more policies, the evaluation otherwise indicates that a warning message should be displayed, or combinations of these.

Figure 9:
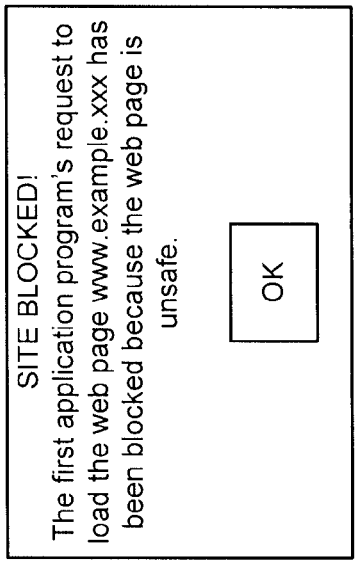
FIG. 9 shows an example of a notification message when an action is conditionally permitted.

An example warning message is shown in FIG. 9. This message includes text such as "WARNING! The first application program is requesting that the web page "www.pirate-games.com" be loaded. This web page may not be safe. Do you want to continue?" Table C below provides some other examples of notification text that may be displayed when a request is blocked.

TABLE C

| Notification Text |
| --- |
| "The first application program is requesting that a text message be sent which will cost you $0.20. Do you want to continue?"
"The first application program is requesting that a call be placed to a recipient in Nigeria. Do you want to continue?"
"The first application program is requesting that a call be made and this call will cost $1/per minute because you have no remaining minutes for the month. Do you want to continue?"
"The first application program is requesting that a streaming video be loaded which will consume a large amount of the mobile device's battery. Do you want to continue?" |

As shown in the example of FIG. 9, the dialog box includes the first option (e.g., "Yes") for the user to continue and the second option (e.g., "No") for the user to cancel the request. In this specific implementation, the web protection program, upon receiving an indication that the request has been canceled, does not pass the request to the second application program. That is, the web protection application program does not generate the second request including the action to be performed by the second application program and the identifier associated with the action. Alternatively, if the web protection program receives an indication that the user wishes to continue, the web protection application program will generate the second request to be received by the second application program. The popup boxes shown in FIGS. 8 and 9 are merely examples of what may happen when a requested action is blocked or conditionally permitted. In another specific implementation, the user is redirected to a server-hosted information page with information about why the requested action is being blocked or conditionally permitted.

In a specific implementation, the web protection application tracks the user's response and transmits the user-response to the server. This may be done in real-time or batch. For example, the user's response may be stored in a user-response log file at the mobile client and periodically transmitted to the server. The log file includes the intercepted identifier and an indication of whether the user decided to cancel or continue anyway. Table D below shows an example of a user-response log file that may be created by web protection application 306 (FIG. 3) to track the user's response to warning messages.

TABLE D

| Identifier | Date and Time of Requested Access | System Response | User Response |
|---|---|---|---|
| www.example5.com | Apr. 1, 2011, 5:30 PM | Displayed warning message | Continue |
| www.example5.com | Apr. 2, 2011 8:00 AM | Displayed warning message | Continue |
| www.example5.com | Apr. 2, 2011 7:00 AM | Displayed warning message | Continue |

The user-response log file, as shown in Table D above, includes the identifier, date and time access was requested or timestamp, the system response, and the user response. In this example, the identifier "www.example5.com" has been classified as "risky" so the system response is to display a warning message to ask whether the user wishes to continue. As shown in the log file, the user has ignored each of the warning messages and has decided to continue with the access of the site. Tracking the user responses allows the system to refine its analysis of the identifier.

In other words, the reputation of an identifier, as shown in the example of Table A above, may be adjusted based on user action. For example, in a specific implementation, the system provides an alert or warning (e.g., FIG. 9) that the site the user is about to visit may be unsafe and aggregates the action users take when they encounter the warning for each specific URI. A large proportion of users choosing to bypass the alert for a given URI may indicate that the evaluation is incorrect. A user choosing to heed the alert, i.e., user stops browsing to the affected site, may indicate that the alert is more likely to be correct. Thus, the system can store user-response information which can factor into the reputation score of a link.

Tracking user-response information allows for dynamic threat level assessments which can affect the overall result. In an embodiment, when a user takes action when given a warning (e.g., "Continue", "Block") on a device, the action is transmitted to a server and stored in a data store. Periodically or after a certain number of actions for a particular identifier are recorded, the server evaluates whether the user behavior indicates an incorrect evaluation or not (e.g., by determining if the proportion of "Continues" is over a given threshold). If the user behavior indicates that the evaluation is incorrect, then the server changes the evaluation transmitted to future users encountering that data store. In a specific implementation, a method includes receiving from a set of clients a set of user-response log files, each log file including an identifier, an indication of whether a warning message was displayed for the identifier, and an indication of whether a user chose to continue despite the warning message. The method further includes generating a ratio based on a number of times the users chose to continue and a number of times the warning message was displayed. If the ratio is greater than a threshold ratio, then updating or changing a reputation of the identifier from a first reputation to a second reputation, different from the first reputation. It should be appreciated that a ratio may instead be calculated based on the number of times the users chose to continue and a number of times the users chose to block (or cancel the action), or based on a number of times the users chose to block and a number of times the warning message was displayed. In a specific implementation, when a client displays a warning for an intercepted identifier, it receives and displays the historical ratio for the identifier. For example, if a user sees data indicating that 80% of users that had encountered a given web site warning chose not to visit the site, they may be more likely to heed the warning. Similarly, if only 3% of users heeded the warning, they may choose to visit the site despite the warning.

Client Assessment

As discussed above, FIG. 5 shows a flow where the intercepted identifier is transmitted from the mobile device client to a server for evaluation. FIG. 6 shows a flow of another specific implementation where the intercepted identifier is evaluated at the mobile device client in the first instance rather than being evaluated by the server in the first instance. Step 605 (intercept request) may be similar to step 510 as described above. Steps 610 (compare with stored identifier list), 615 (identify policy and evaluate), and 625 (block, permit, or conditionally permit) may be similar to steps 525, 530, and 550 respectively, as discussed above except that in this specific implementation, the comparison and policy evaluation occur at the mobile client device such as by a client-side analysis module at the mobile device.

In a specific implementation, the server transmits the identifier list (e.g., identifier list 1005—FIG. 10) to the mobile device client. The identifier list is stored at the client, e.g., stored in a local cache at the client.

In a specific implementation, if the client-side analysis module can make an assessment based on the identifier list stored in the local cache in the first instance, then the intercepted identifier is not transmitted to the server for evaluation. The locally cached identifier list can be a blacklist, whitelist, or graylist. For example, the mobile device may maintain a list (e.g., whitelist) of URIs that never need to be checked because they are assumed to be safe. Conversely, the mobile device may maintain a list (e.g., blacklist) of URIs that should never be visited because they are inherently malicious. In a specific implementation, the client-side analysis module analyzes one or more policies stored at the mobile client device. For example, there can be a parental-control policy at the mobile client device that is user-configurable. This allows, for example, a parent to configure the policy. In a specific implementation, multiple types of identifiers may be stored in the local cache. The identifiers in the local cache may have varying levels of specificity so that a given intercepted identifier may have an exact match or a partial match. For example, if the URL "http://www.example.com/a/b/c.html" is intercepted, then the local cache may have that exact URL stored so that the mobile client does not need to contact the server for an evaluation. If the local cache does not contain the exact URL, but instead has the server name "www.example.com", the evaluation for the server name is used to evaluate the intercepted identifier. In a specific implementation, if multiple identifiers in the local cache match the intercepted identifier, the most specific entry in the local cache is used to evaluate the intercepted identifier. For example, a cached entry for "www.example.com" is preferred over "example.com".

In a specific implementation, the client stores results received from the server in the local cache. For example, if the client intercepts an identifier and does not have a matching entry in its local cache, then it requests an evaluation from the server. The server returns an evaluation and the client stores that evaluation in its local cache so that if that same identifier is requested again, the client does not need to contact the server. The evaluation can be performed on the device based on the data stored in the local cache. In a specific implementation, the server's evaluation is based on a partial match in its list of identifiers (e.g., domain name used to evaluate an intercepted URL) and the response to the client it returns is the entry in the identifier list used to make the evaluation. For example, if the intercepted identifier was "http://www.example.com/a" and the server used an entry in the identifier list for the domain "example.com," the server transmits that identifier and its corresponding evaluation to the client so the client can update its local cache and not request an evaluation from the server for other URLs that match the domain "example.com."

In a specific implementation, the server transmits additional identifiers to the client in response to an evaluation request for an identifier. For example, if a user visits a home page "http://www.example.com," it may be desirable for the client's local cache to be pre-populated with identifiers that he or she is likely to visit next to avoid having to wait for a response from the server. In this case, the server's response to a request for an evaluation for "http://www.example.com" may include evaluations and corresponding identifiers such as the host name "download.example.com," the URL "http://www.example.com/login," and so forth. When the client receives identifiers and evaluations beyond what it requested, it stores them in its local cache.

The identifier list stored in the mobile device local cache, for example, can include multiple categories and classifications of identifiers such as shown in FIG. 11. If, however, the analysis module in the mobile device determines that the identifier is not in the locally cached identifier list or the client-side analysis module cannot make an assessment, then the mobile device analysis module transmits the intercepted identifier to the server for evaluation (step 620). The evaluation may then occur at the server as shown in FIG. 5 and described in the discussion above accompanying FIG. 5.

One reason for evaluating the intercepted identifier at the mobile device in the first instance is because generally, each API call from the mobile device to the server costs time and money, so it is generally desirable to minimize the number of calls. For example, there can be delays when communicating across a network between the mobile device and server thereby creating undesirable waiting for a user trying to visit a web page. There can also be monetary costs to access the network that may be charged by the service or network provider. Call volume can be reduced by keeping track of URIs that do not need to be checked with the server. Before the mobile device system calls the server API, the system checks the local cache and blacklists/whitelists. If the mobile device system can make an assessment based on those lists, the appropriate action will be taken by the mobile device itself and the API will not be called.

In a specific implementation, the identifier list stored at the mobile device local cache includes an assessment and an indication of how long the assessment is valid. The indication can include a date and time of the assessment and a validity period of the assessment indicating a duration of time for which the assessment is valid. The system determines if a time of the request is within the validity period as measured from the date and time of the assessment. If the time of the request is within the validity period, the system makes a determination of whether to block, permit, or conditionally permit the request without transmitting the intercepted identifier to the server. If the time of the request is after the validity period, i.e., the assessment of the identifier has expired, the mobile client system transmits the identifier to the server for evaluation.

Table E below shows an example of a specific embodiment of the identifier list having identifier assessments and validity periods associated with each of the assessments.

TABLE E

| Identifier | Assessment | Date and Time of Assessment | Validity Period (hours) |
|---|---|---|---|
| www.wellsfargo.com | Safe | Apr. 16, 2011, 5:00 PM | 24 |
| www.youtube.com | Safe | Apr. 16, 2011, 5:30 PM | 1 |
| www.youface.com | Risky | Apr. 16, 2011, 5:45 PM | 10 |
| www.facebook.com | Risky | Apr. 16, 2011, 6:00 PM | 15 |

As shown in the Table above, each entry includes an identifier, assessment, date and time of the assessment, and a validity period. For example, the identifier "www.wellsfargo.com" has an assessment of "safe." The assessment was performed on Apr. 16, 2011 at 5:00 PM. The assessment has a validity period of 24 hours. Thus, the expiration date and time for the assessment is the next day at 5:00 PM (i.e., Apr. 17, 2011 at 5:00 PM or 24 hours from Apr. 16, 2011, 5:00 PM).

If a request having an action to load the specific identifier "www.wellsfargo.com" was made on April 17 at 8:00 AM, then the determination of whether to block, permit, or conditionally permit the request is made at the mobile client device without transmitting the identifier to the server because the time of the request is within the validity period of the assessment.

In contrast, if the request was made on April 18, then the mobile device system transmits the identifier (e.g., "www.wellsfargo.com") to the server for evaluation because the assessment of "safe" has expired or is no longer valid.

As shown in Table E above, each entry includes a validity period and the validity period can be different for each entry. That is, a first entry may include a first validity period. A second entry may include a second validity period, different from the first validity period. The different validity periods may be determined, for example, based on the category with which the identifier is associated. Categories having URIs that host continuously changing user-generated content may have a shorter validity period than categories having URIs that host little or no user-generated content that may have a longer validity period because these sites are less likely to have links to undesirable resources (e.g., malicious web pages).

Thus, in the example shown in Table E above, the second entry for the identifier "www.youtube.com" has been assessed as "safe," but has a validity period of 1-hour—much less than the 24-hour validity period of "wellsfargo." The cache may be configured differently for different categories. In this example, a site that was a bank yesterday is probably still a bank today, but a site that hosts continuously changing user-generated content (e.g., "youtube") could get several different assessments within the same day.

In the example shown in Table E above, the unit of time for the validity period is in hours. However, it should be appreciated that any unit of time may be used (e.g., minutes, days, weeks, and so forth).

The validity period shown in Table E and discussed above is associated with an identifier list that is stored in the local cache of the mobile client device. However, in another specific implementation, a validity period is associated with an identifier list that is stored at the server. In this specific implementation, if the validity period has expired or elapsed, then the server may, for example, revisit the resource, e.g., web page, associated with the identifier to reassess the resource.

Instead of a validity period, in another specific implementation, there can be an expiration date and time associated with the list of identifiers stored at the mobile client device. In this specific implementation, if the time of the request is before the expiration date and time, the mobile device system makes a determination of whether to block, permit, or conditionally permit the request without transmitting the intercepted identifier to the server. If the time of the request is after the expiration date and time, the system transmits the identifier to the server for evaluation.

The feature of storing the list of identifiers at the mobile client device may be referred to as a device-side cache. In this specific implementation, a list of recently visited sites is maintained on the mobile device. Each assessment has a configured "lifetime," meaning the assessment that a site is safe may last for one hour. During that hour, the client will not have to call the API to know how to respond to the URI.

The mobile client device can receive the list of identifiers from the server, from an external source (e.g., third-party source), or both. In a specific implementation, the server periodically sends a list of the most often visited sites, along with the assessments for those sites. For example, the server may log the 10,000 URIs that are submitted to the API the most often in any given day. When a given user visits a URI, that URI is statistically likely to be in this set, so it is advantageous to send the full list to the user's device and cache it there. In a specific implementation, the system logs each intercepted identifier submitted by each of the mobile devices, ranks each intercepted identifier by frequency of submission, and selects a subset of the most-frequently submitted intercepted identifiers to transmit to the mobile device.

Because URIs that are in the device-side cache do not require active server evaluation, steps may need to be taken to ensure that URIs that maintain a high visitation frequency remain in the cache, but sites that drop in visitation frequency are removed from the cache. In an embodiment, the device transmits URIs that it visits to the server even if the URI is in the device-side cache. Multiple URIs may be stored and transmitted at a later time than when they are accessed to avoid slowing down the device when it is actively in use by its user. The server thus has an up-to-date assessment of the visitation frequency of URIs in the device-side cache. In an embodiment, some devices using the server to evaluate identifiers store a device-side cache and do not inform the server when evaluation can be completed locally; however, other devices using the server do not store a device-side cache so that the server can account for changes in visitation frequency for the list of most frequently visited sites.

The list of identifiers transmitted from the server to the mobile client device can replace an existing list of identifiers at the mobile client device. Alternatively, the list of identifiers may be added to the existing list of identifiers at the mobile client device so the list transmitted to the device is only a set of changes made since the previous list.

In a specific implementation, the list of identifiers received at each of the mobile devices is the same. That is, each mobile device receives substantially identical identifier lists. In another specific implementation, the mobile devices can receive a different list of identifiers. That is, a first list of identifiers may include identifiers that are different from identifiers in a second list of identifiers. The first and second list of identifiers may have the same identifiers, but each list has a different identifier assessment, validity period, or both.

One advantage of sending different lists of identifiers to different mobile devices is that the identifier list can be customized for each of the target mobile devices. For example, generally, an iPhone is not intended to run Android apps. So, in this specific implementation, the server will not send an identifier list pointing to Android apps to an iPhone. This can help to reduce network traffic and make efficient use of the limited storage space on the mobile device. In another example, because users in one country may typically visit different websites than users in another country, the list may differ based on the country the device is located in.

Figure 7:
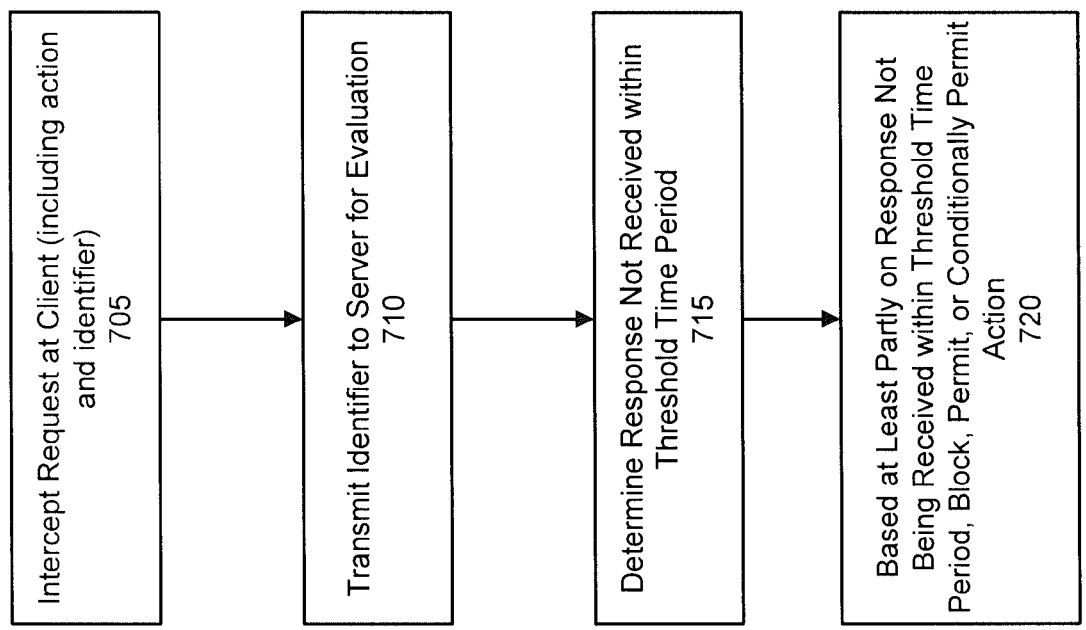
FIG. 7 shows a flow diagram of the client not receiving an evaluation response from the server within a threshold time period.

Identifier Transmitted to Server for Assessment, but No Response Received from Server FIG. 7 shows a flow where the identifier is transmitted to the server for evaluation, as in the first instance shown in FIG. 5, but a response from the server is not received within a threshold time period. This may be referred to as a "latency time-out." In steps 705 and 710, the request is intercepted and the identifier in the request is transmitted to the server for evaluation. Steps 705 and 710 may be similar to steps 510 and 515 discussed above in connection with FIG. 5. In a step 715, the mobile client determines that a response has not been received from the server within a threshold time period. The threshold time period can range from about 1 second to about 10 seconds, including for example, 4, 5, 6, 7, 8, or 9 seconds. The threshold may be less than 1 second or more than 10 seconds.

In an embodiment, the threshold time is determined by the device based on the type of network the device is connected to. For example, on a Wi-Fi network, the timeout may be low, e.g., 150 milliseconds, whereas on a cellular network, the timeout may be higher, e.g., 3 seconds. Varying the threshold time based on type of network helps to provide a consistent user-experience. For example, generally, some networks are faster than others. A typical web page response on Wi-Fi may take less time than a typical response over a cellular connection. If the server is down or a network link is not working correctly, it is generally undesirable to have the user wait an atypical amount of time for a response. Rather, it can be desirable to fail as fast as possible, allowing the user to continue. Or, in other words, to have a short threshold time period. If a user is on a slow network, a slower response can be acceptable (because the whole browsing process is slow and thus the user may be accustomed to waiting); however, if a user is on a fast network, then a similarly slow response can be unacceptable because the browsing process is much faster and thus the user is accustomed to fast response times. In step 720, based at least partly on the server response not being received within the threshold time period, the mobile device system implements an action to block, permit, or conditionally permit the request.

Because network connectivity may prohibit a mobile client from receiving an evaluation from a server, it is advantageous to utilize information is stored on the mobile client to form a decision. The action or outcome (i.e., whether to block, permit, or conditionally permit the request) may vary based on factors available to the mobile client such as the reputation of the identifier or associated identifiers (e.g., domain name, host name), the reputation of the first application (i.e., the application that initiated the request), the category that the identifier or associated identifiers falls under, and others. For example, if the mobile client has information indicating that the first application is from a well-known and well-regarded developer (i.e., the first application has a high reputation score), the outcome may be that the request is permitted. Alternatively, if the mobile client has information indicating that the first application is from a developer known for developing, for example, spyware, the first application would have a low reputation score and the outcome may be that the request is blocked. For example, if an identifier is a URL, then associated identifiers could include the host name, domain name, or top-level domain portions of the URL, so if an exact evaluation of a full URL is unavailable, the action for the URL is determined by cached evaluations for the domain name or top-level domain, if they are available. For example, sites under the ".edu" top level domain may be treated differently than sites under the ".cn" top level domain.

The duration of the time period may also vary based on similar factors known to the mobile client (e.g., reputation of identifier, reputation of first application, category that the identifier falls under, and others). For example, if the identifier or associated identifiers falls under a "poor" reputation, then the threshold duration may be longer than if the identifier or associated identifiers falls under a "good" reputation. That is, the mobile client system will give the server a longer period of time in which to respond. If the mobile client system does not receive a response from the server within that time period then the mobile client system may block the request.

Alternatively, if the identifier or its associated identifiers falls under a "good" reputation, the threshold duration may be shorter. That is, the mobile client system will give the server a shorter period of time in which to respond. If the mobile client system does not receive a response from the server within that time period then the mobile client system may still allow the request. In a specific implementation, the mobile client system can allow the request (even though the mobile client has not received the identifier evaluation), but take extra precaution in allowing the request such as adjusting or changing the security settings of the mobile client device to a higher level. For example, this could include changing the browser settings to automatically quarantine downloaded files, to prompt the user before downloading files, to block JavaScript from executing, to block the loading of content such as PDF or Flash objects, to block some browser features such as location or local storage, and so forth. Thus, in a specific implementation, a method includes after determining a response has not been received from the server within a threshold time period, permitting the requested action at the client where the permitting the requested action includes changing a security setting of the application program from a lower setting to a higher setting.

In some cases, a response from the server will have been received by the client mobile device after the threshold time period has elapsed and after the requested action has been permitted. If, for example, the response indicates that the identifier is on a blacklist, the web protection application can terminate the application program that initiated the request, the application program that received the request or both. As another example, if the response indicates that the identifier is on a graylist, the web protection application can display a warning message to the user such as, "This web page may have potentially malicious content. Do you still wish to continue?"

Figure 12:
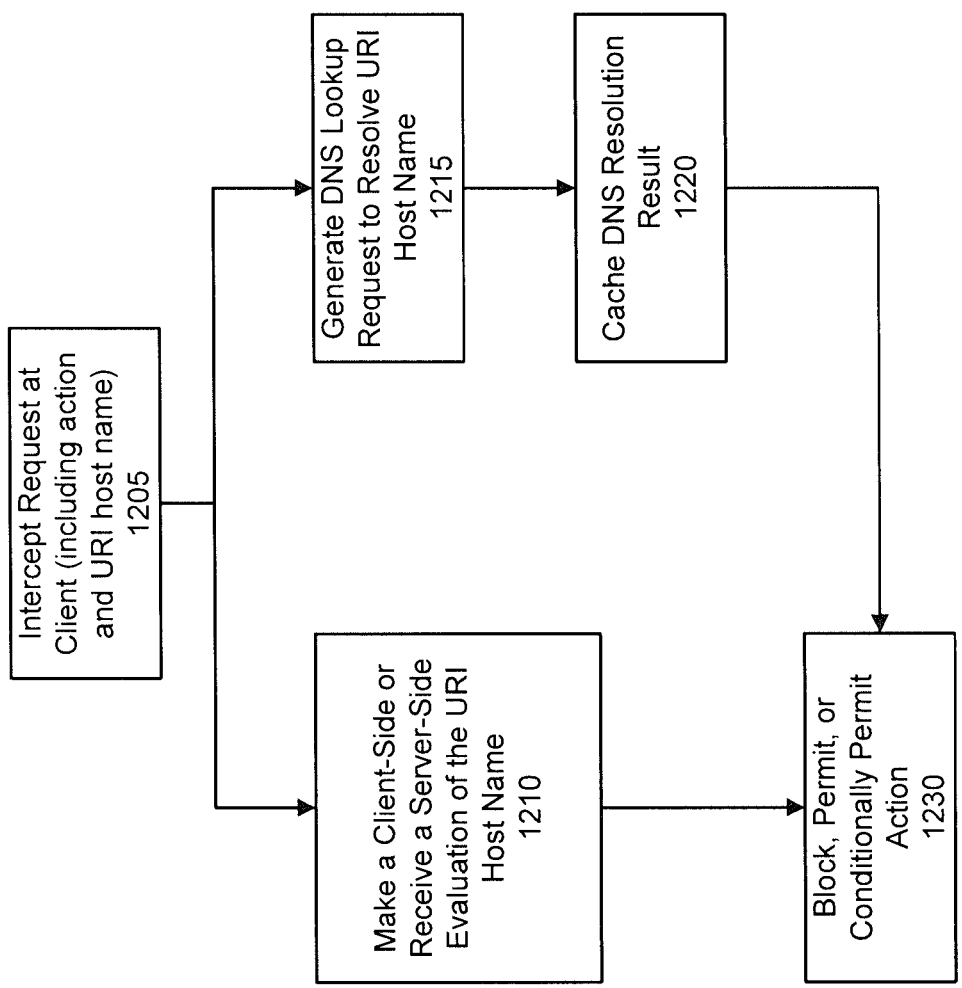
FIG. 12 shows a flow diagram for concurrent DNS lookup and identifier evaluation.

FIG. 12 shows a flow of a specific implementation where an identifier of an intercepted request includes a URI host name which is resolved in parallel with URI evaluation. Specifically, in a step 1205, web protection application 306 (FIG. 3), intercepts a request including an action and URI host name. In a step 1210, the URI host name is evaluated to determine whether, for example, the URI is in a blacklist of prohibited URIs or is in a whitelist of permitted URIs. The URI may be transmitted (e.g., via a user datagram protocol ("UDP") request) to a server for evaluation as shown in FIG. 5 and described in the discussion accompanying FIG. 5. Alternatively, evaluation may occur at the client device as shown in FIG. 6 and described in the discussion accompanying FIG. 6.

In this specific implementation, the URI host name is resolved in parallel with the URI evaluation. In other words, the URI host name is resolved during the URI evaluation. That is, time periods for URI host name resolution and URI evaluation at least partially overlap. Generally, host names are associated with or are assigned Internet Protocol (IP) addresses. For example, the host name "mylookout.com" is associated with the IP address "207.7.137.130." When a request is made to access a web site via its host name through a browser, the browser checks whether or not the IP address associated with the host name is in the local client cache. If the associated IP address is not in the local cache, then a DNS request (e.g., via the UDP protocol) is sent to a DNS server which resolves the host name and responds to the client with the IP address. The browser can then use the IP address to access the website.

In a step 1215, the web protection application generates (or instructs the client operating system to generate) a domain name service (DNS) lookup request to resolve the intercepted URI host name. In a step 1220, the DNS resolution result, including the associated IP address of the URI host name, is received from the DNS server and cached at the client. For example, if the client uses an operating system provided DNS APIs and the operating system's DNS service is configured to cache DNS results, then the DNS results returned by the DNS server are cached and available for all applications on the device, not just the safe browsing application.

In a step 1230, if, for example, the action is permitted or conditionally permitted, the browser can use the cached IP address to access the web site, rather than having the user wait while a DNS lookup request is made. In other words, this specific implementation allows the IP address to have been cached at the client before the step of blocking, permitting, or conditionally permitting the action because the DNS lookup request is processed concurrently with the evaluation of the URI. This enhances the user experience because it helps to reduce the amount of time the user spends waiting for a result. Information stored in cache can be accessed much quicker than information stored across a network on a remote server. For example, the process of resolving the URI host name and the process of evaluating the URI each involve a certain amount of time as data may be sent across the network. Having these two processes occur simultaneously or concurrently can help to provide the user with fast results. In cases where the intercepted identifier (e.g., URI) is transmitted to the server for evaluation, the DNS lookup request may be generated before, after, or with the transmission of the URI to the server for evaluation. In cases where the intercepted identifier is compared with a stored list of identifiers in the client cache, the DNS lookup request may be generated before, after, or with the comparison.

Figure 13:
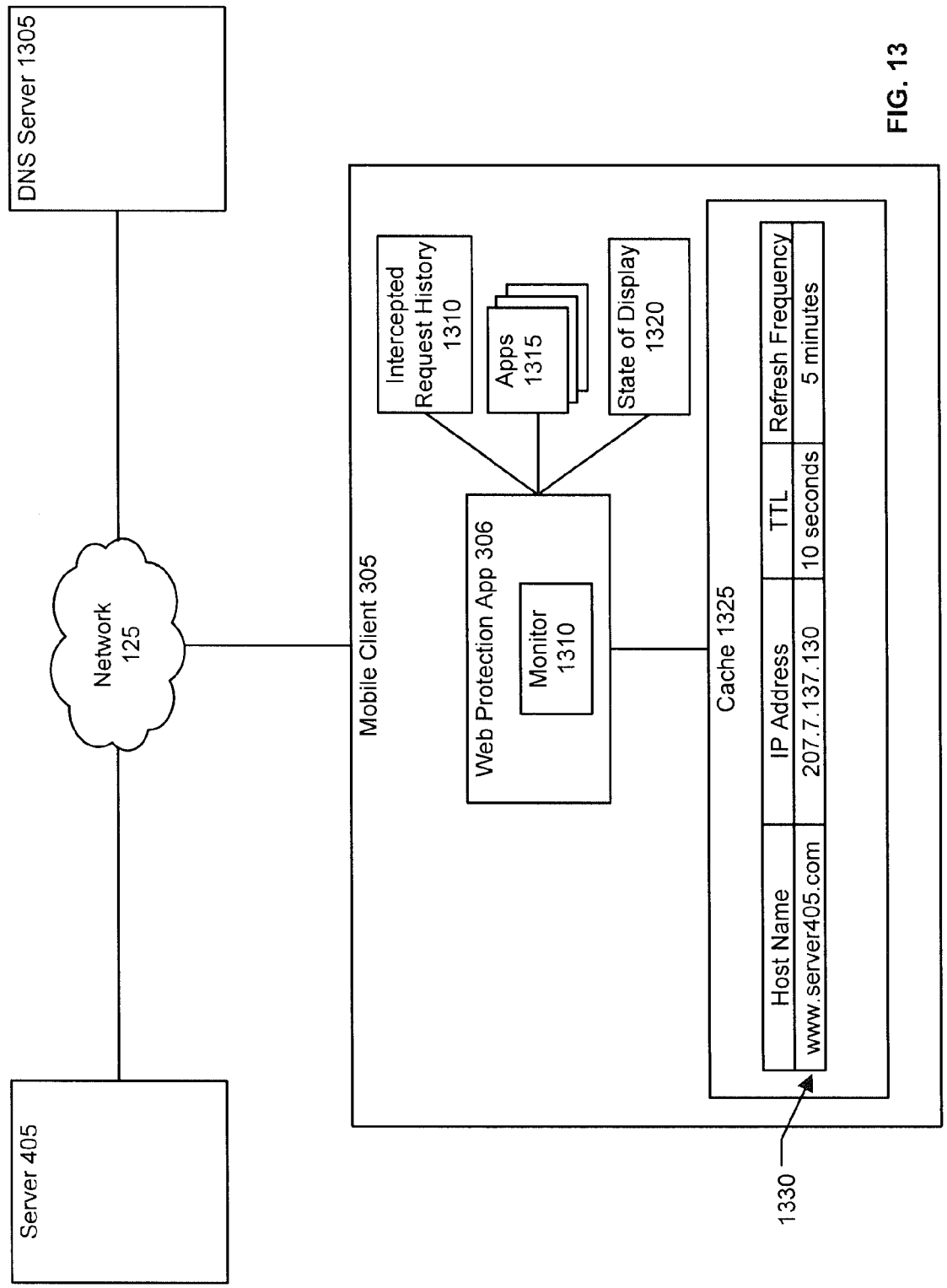
FIG. 13 shows a block diagram for pre-resolving the server host name and caching its value at the client.

FIG. 13 shows a block diagram of a system for pre-resolving the server host name and caching its value at the client. As shown in the example of FIG. 13, there is a Domain Name System (DNS) server 1305, server 405, and mobile client 305. The server and mobile client may be as shown in FIGS. 3 and 4, respectively, and discussed above. The DNS server translates the host name to an IP address. The IP address is stored in a cache 1325 at the mobile client. The cache includes a resource record 1330 which associates a host name (e.g., "server405.com") with the corresponding IP address (e.g., "207.7.137.130").

A time-to-live (TTL) value specifies the length of time that the resource record should be stored in cache. In the example of FIG. 13, the TTL value is "10 seconds." After the time has elapsed, the record should be discarded and a new DNS request should be generated to re-resolve the host name. This process is typically not problematic for desktop clients because such clients typically use a low latency network. However, other client devices, such as mobile phones, use a high-latency network where multiple serial queries can affect performance. Further, repeatedly re-querying the DNS server to resolve server 405 can drain the client battery. Thus, this specific implementation provides for, based on user activity rather than TTL value, periodically pre-resolving the server host name and caching its value. When server 405 is to be queried, the last cached IP address is used, regardless of the TTL value. DNS requests to re-resolve the host name can be prevented or suppressed when there is no such user activity such as by using a custom DNS client rather than the OS-provided DNS system. This allows the application to control when to make a DNS query versus when to use an IP address from cache. Not making DNS requests when there is no such user activity can help to preserve the battery life of the mobile client and reduce network traffic.

More particularly, in this specific implementation, web protection application 306 at the mobile client includes a monitor module 310 which monitors activity at the mobile client to determine whether the user is engaged in an activity that would trigger request 325 (FIG. 3) for the web protection application to contact the server for evaluation of the request. The monitor module may review intercepted request history 1310 to determine whether or not there has been activity within the last or rolling threshold time period, applications 1315 to determine which application is in the foreground, a state 1320 of the mobile client display to determine whether or not the display is active or inactive (e.g., "on" or "off"), or combinations of these. If the user is engaged in an activity that might result in server 405 being contacted, the host name associated with server 405 is periodically re-resolved as specified by a refresh frequency. In this specific implementation, as shown in FIG. 13, the refresh frequency is about 5 minutes. However, the refresh frequency can range from about 1 minute to about 10 minutes. This includes, for example, about 2, 3, 4, 6, 7, 8, 9, or more than 10 minutes. The refresh frequency may be less than 1 minute (e.g., 59 seconds). Factors affecting the refresh frequency interval include network latency, battery management characteristics, whether or how often the mobile client is plugged in, or combinations of these.

Figure 14:
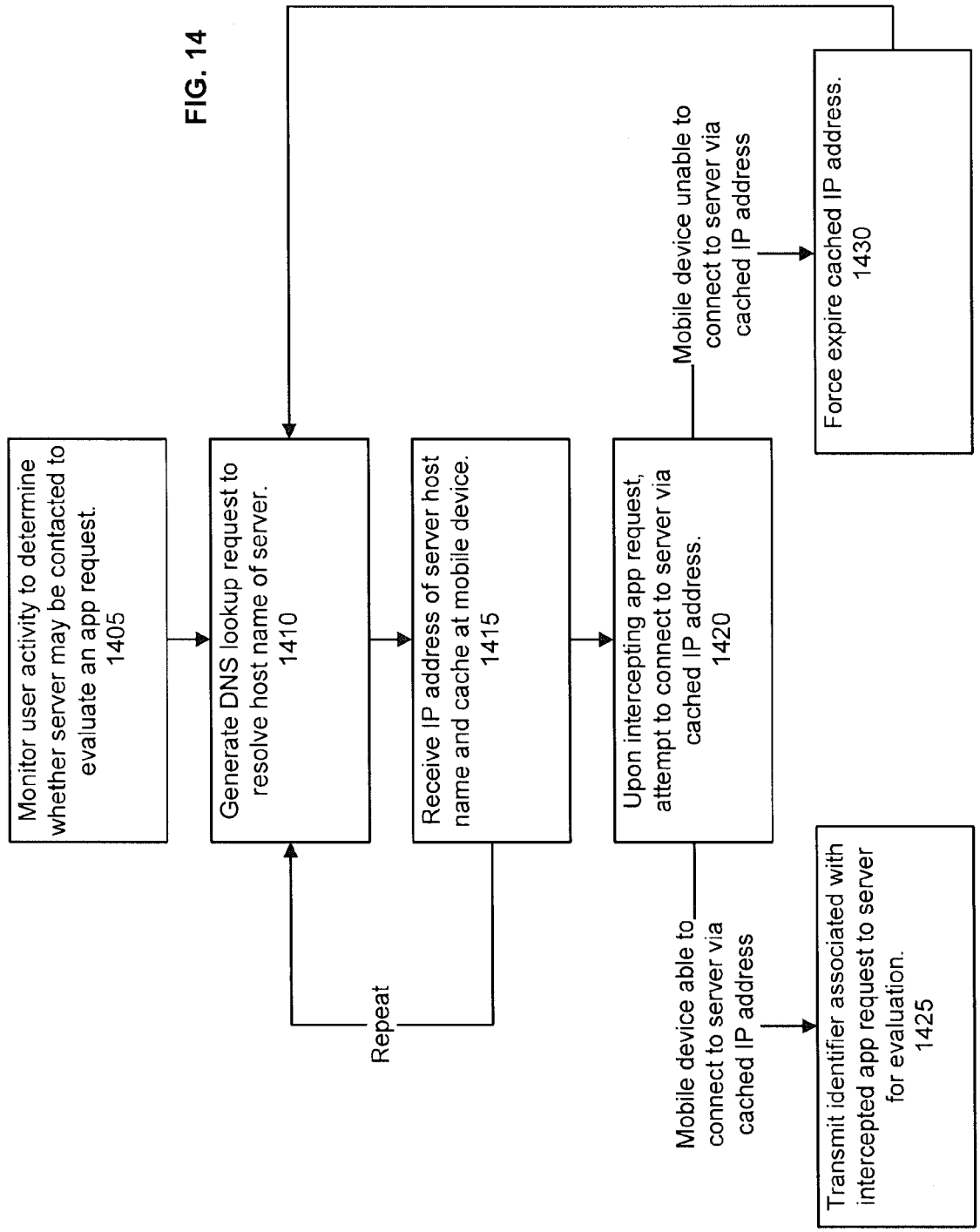
FIG. 14 shows a flow diagram of the system shown in FIG. 13.

FIG. 14 shows a flow of the system shown in FIG. 13. In a step 1405, monitoring module 1310 (FIG. 13) monitors user activity to determine whether the server may potentially be contacted to evaluate request 325 (FIG. 3) made by an application program. For example, as discussed above, the monitoring module may analyze applications on the mobile client to determine which application the user is interacting with, i.e., which application is in the foreground of the mobile client. If the application that the user is interacting with has the capability to, for example, open a web page, e.g., application is a browser, a DNS lookup request is generated (step 1410) to resolve the host name of server 405. Other examples of user activity that may generate a DNS lookup request include the user interacting with an application that has text messaging capabilities, phone call capabilities, e-mail capabilities, or combinations of these. Another example of user activity that may generate a DNS lookup request include the user interacting with an application that has the capability to launch another application that has web browsing capabilities, text messaging capabilities, phone call capabilities, e-mail capabilities, or combinations of these.

In a step 1415, the IP address of the server host name is received and cached at the mobile device. As long as the user remains engaged in the activity, steps 1410 and 1415 are periodically repeated according to the specified refresh frequency. For example, monitor module 1310 (FIG. 13) may examine intercepted request history to determine whether or not request 325 was made within the last refresh time period. If the request was made within the last refresh time period, a DNS lookup request (step 1410) is generated. If the request was not made within the last refresh time period, the DNS lookup request is not generated. For example, a request not being made within the last refresh time period may indicate that the user is no longer engaged in a browsing activity or session. The monitor module may monitor the state of the display of the mobile client. If the display is "on," the DNS lookup request may be generated. If the display is "off," the DNS lookup request may not be generated.

In a step 1420, request 325 (FIG. 3) is made, such as by first application program 325, and web protection application 306 intercepts the request. The web protection application attempts to contact server 405 via the cached IP address, regardless of the TTL value associated with the cached IP address. For example, the TTL value may indicate that the cached IP address for server 405 has expired, but the web protection application will still attempt to contact server 405 with the cached IP address.

In a step 1425, if the web protection application is able to connect to server 405 via the cached IP address, identifier 340 (FIG. 3) associated with the intercepted request is transmitted to server 405 for evaluation as shown in FIG. 5 and discussed above. However, in a step 1430, if the web protection application is unable to connect to server 405 via the cached IP address, the cached IP address is force expired or manually expired (step 1430). A DNS lookup request is generated to re-resolve the host name of the server (step 1410) and the web protection application makes another attempt to connect to server 405 using the re-resolved host name. Thus, a DNS lookup request may be generated even if the TTL value for the cached IP address indicates that the resource record is still valid or has yet to expire. In this specific implementation, the cached IP address and when it is refreshed or the interval at which it is refreshed is independent of the TTL value or is decoupled from the TTL value. Thus, the user does not have to wait until the TTL time period has elapsed for there to be a DNS lookup request to resolve the host name of server 405. Conversely, a DNS lookup request may be prevented even if the TTL time period has elapsed indicating that a DNS lookup request should be made.

Figure 15:
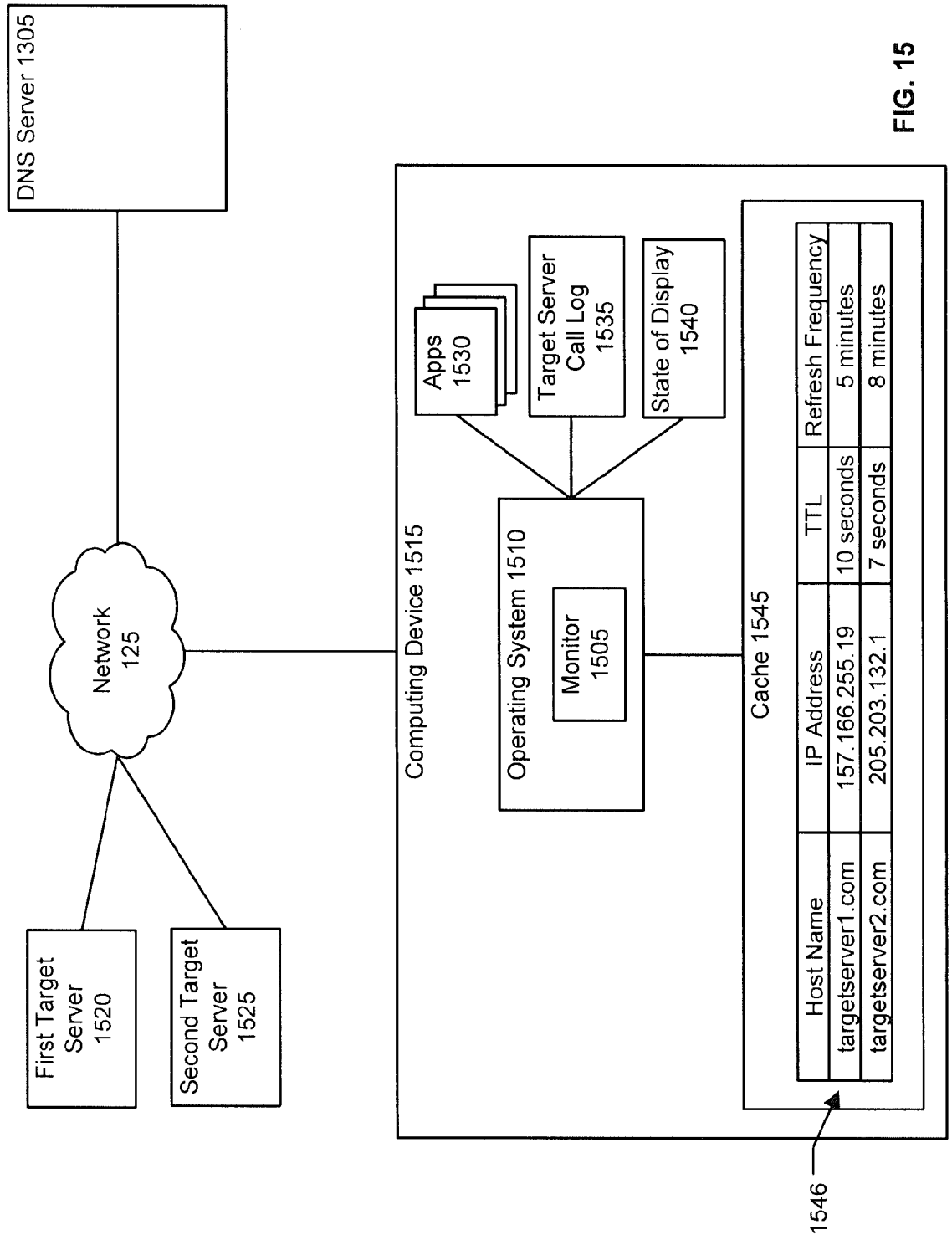
FIG. 15 shows a block diagram for pre-resolving any server host name and caching its value at the client.

FIG. 15 shows a block diagram of another implementation of a system for pre-resolving a server host name and caching its value at the client. The system shown in FIG. 15 is similar to the system shown in FIG. 13. In the system of FIG. 15, however, a monitoring module 1505 is designed to be part of an operating system or operating system kernel 1510 of a client computing device 1515. Further, as discussed below, the system shown in FIG. 15 is adapted to pre-resolve any server host name.

In particular, FIG. 15 shows one or more target servers such as first and second target servers 1520 and 1525, respectively, DNS server 1305, and client computing device 1515 which are each connected to network 125. The client computing device may be a computing device as shown in FIG. 2 and described above. FIG. 15 shows two target servers, however, it should be appreciated that there can be any number of target servers, e.g., 1, 5, 10, 50, 100, and so forth. Monitoring module 1505 of the client operating system monitors activity at the client and, specifically, can monitor and analyze applications 1530 on the client, a target server call log 1535, a state 1540 of the display (e.g., display "On" versus "Off"), or combinations of these. A cache 1545 at the client may be similar to cache 1325 as shown in FIG. 13 and described in the discussion accompanying FIG. 13.

That is, cache 1545 can include resource records 1546 which associate host names with corresponding IP addresses. For example, the host name "targetserver1.com" is associated with the IP address "157.166.255.19." The host name "targetserver2.com" is associated with the IP address "205.203.132.1." A TTL value specifies the length of time that the resource record should be stored in cache. A refresh frequency specifies a time interval at which the host name is re-resolved during certain user activity. Two or more resource records may have the same or may have different refresh frequencies. In this specific implementation, when a target server is to be contacted, the last cached IP address associated with the target server is used, regardless of the TTL value. DNS requests to re-resolve the host name can be prevented or suppressed (e.g., not generated), regardless of TTL, when there is no user activity to help preserve the battery life of the device and reduce network traffic.

The operating system (OS) acts as a bridge between the applications and hardware of the computing device. Responsibilities of the OS include, for example, managing the resources of the device, communications between the software and hardware components, and many other responsibilities. In a specific implementation, monitoring module 1505 functions at the OS level or is a part of the OS. That is, in this specific implementation, the monitoring module is internal to the OS. In another implementation, the monitoring module is external to the OS. For example, the monitoring module may be an independent application program or code module. The monitoring module may be implemented via add-ins, plug-ins, scripts, macros, extension programs, libraries, filters, device drivers, or combinations of these. In one implementation, the monitoring module is installed in an existing OS to implement the monitoring functions. That is, the monitoring module includes code that is not native to the OS. In another implementation, the monitoring module includes code that is native to the OS.

Applications 1530 may include applications such as those described in connection with FIG. 3. For example, as discussed above, such applications or "apps" may be directed towards business, games, entertainment, sports, education, medical, fitness, news, travel, photography, and so forth. In some cases, when an application is launched or while the application is being used by the user, the application will make a call to a remote server, i.e., a target server. For example, an app such as Google News may access or contact various content providers to download various news items to the client.

Such calls to the remote target servers can be stored or logged in the target server call log at the client. Table F below show an example of some of the activity information that may be collected in the target server call log.

TABLE F

| Application | Target Server Accessed |
|---|---|
| Google News | www.cnn.com |
| Google News | www.nytimes.com |
| Google News | www.wsj.com |
| TwitterMobile | twitter.com |
| WatchESPN | espn.com |

As shown in Table F, a column "Application" lists the name of the application that was launched. A column "Target Server Accessed" lists the websites or host name that the corresponding or respective application accessed. For example, as shown in the above Table, in a previous or prior activity session, the user may have launched the application "Google News" and, via the application, read articles from CNN (www.cnn.com), The New York Times (www.nytimes.com), and the Wall Street Journal (www.wsj.com). The target server call log may further include additional historical activity data such as a timestamp indicating the time and date the website was accessed, a duration indicating the amount of time the user spent browsing the website, and so forth.

The user may be prompted to authorize the collection of the information in the target server call log before such information is collected. This helps to ensure that the user's privacy is respected. The log may be stored in an unencrypted or encrypted format to prevent unauthorized access such as if the device is lost or stolen. Entries in the log may be automatically deleted based on a threshold number of entries allowed to be stored or date of the entry so that older entries are deleted. This too can help to address any privacy concerns that a user may have.

Figure 16:
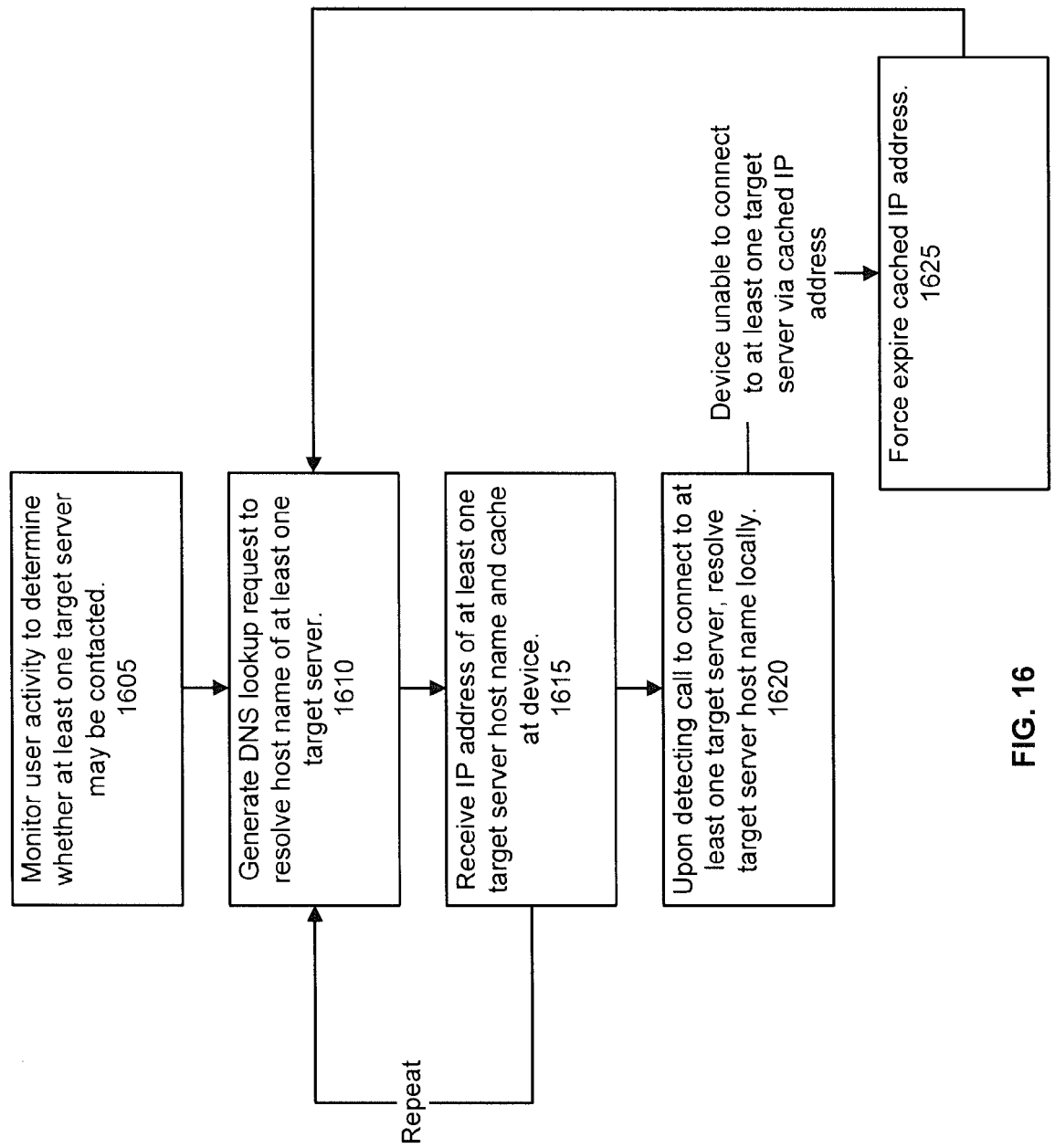
FIG. 16 shows a flow diagram of the system shown in FIG. 15.

FIG. 16 shows a flow of the system shown in FIG. 15. In brief, in a step 1605, monitoring module 1505 monitors user activity at the mobile device to determine whether the user is engaged in an activity that may trigger a call to a target server. In a step 1610, if the user is engaged in such an activity, a DNS lookup request is generated to resolve a host name of the target server. In a step 1615, the IP address corresponding to the host name is received at the client from the DNS server and cached. In a step 1620, upon detecting a call or attempt to contact, connect, or access the target server, the target server host name is resolved locally, i.e., at the client via the cached IP address. In a step 1625, if the client is unable to connect to the target server via the cached IP address, the cached IP address is force expired and a new DNS lookup request is generated (step 1610).

More particularly, in step 1605, monitoring module 1505 (FIG. 15) can use target server call log 1535 to help determine whether the target server may be contacted based on current user activity. In this specific implementation, the monitoring module identifies which application has been launched, and analyzes or scans the target server call log to find an entry for the application. If an entry is found, the monitoring module may determine that the user is engaged in an activity that may result in one or more target servers associated with the application being contacted. Monitoring module 1505 can analyze and identify which applications the user is interacting with, e.g., which application is in the foreground, the state of the display, e.g., whether the screen of the device is "On" or "Off," or both when making the determination.

In step 1610, DNS lookup requests are periodically generated in the background to resolve the host name of the target server. The DNS lookup request may be generated prior to or before the target server is contacted by the application, while the user is engaged in the activity (e.g., while the user is using the application), or both. For example, monitoring module 1505 may detect that the user has launched the application "Google News." The monitoring module consults the target server call log (see, e.g., Table F) and discovers an entry for the application indicating that in or after a prior or previous launch of the application, the target servers or websites for CNN, The New York Times, and the Wall Street Journal were contacted. The system can then pre-resolve the host names associated with each of these target servers by generating DNS lookup requests. In other words, the application called on the target server in the past (but has not called the target server in the current activity session). However, because application called the target server in a previous activity session, when the user opens that application, the system will keep the DNS record associated with the target server alive. For example, a Facebook application may have previously called api.facebook.com. So, when the user opens the Facebook application, the system will keep the associated DNS record alive. That is, the next time the user opens the Facebook application, the system proactively resolves the associated host.

In step 1615, the IP address associated with the target server host name is received and cached at the client such as in cache 1545 (FIG. 15). Thus, with reference to the example above, IP addresses for CNN (e.g., 157.166.255.19), The New York Times (e.g., 170.149.173.130), and the Wall Street Journal (e.g., 205.203.132.1) are received and stored at the client. While the user remains engaged in the activity, steps 1610 and 1615 may be periodically repeated as specified by a refresh frequency (see FIG. 15). For example, the system may determine that the user is engaged in the activity (e.g., using "Google News") based on whether the application is in a foreground of the device.

In step 1620, upon detecting a call by the application program to connect to the target server, the target server host name is resolved locally, i.e., at the client. For example, if during a current session for the application, "Google News" the user selects a news item from CNN, the application will be provided the cached IP address for CNN, e.g., 157.166.255.19—regardless of the TTL value associated with the IP address. In other words, in this specific implementation, the application is provided with the cached IP address even if the TTL value indicates that the cached IP address is invalid.

In step 1625, if the application is unable to access the target server via the cached IP address, the cached IP address is force or manually expired. For example, the cached IP address may be expired even if the TTL value indicates that the IP address is valid. A new DNS lookup request is generated (step 1610) to re-resolve the target server host name so that the application can access the target server.

Thus, the target server call log can be used to help predict or anticipate which websites a user may or is likely visit. Pre-resolving or pre-fetching the IP addresses can help to reduce the amount of time a user spends waiting to see results. For example, when the user makes a selection in the application that triggers a call to be made to a target server, the application can use the cached IP address associated with the target server rather than having to traverse the network with a DNS request to the DNS server for the target server and wait for a response from the DNS server.

In a specific implementation, the system and flow in FIGS. 15-16 is implemented so that they are independent of web protection application 306 (FIG. 3). In other words, in this specific implementation, the techniques for cache-expiry based on server reachability and periodically retrying based on user activity can be performed independently of the web protection application. The monitoring module, as shown in FIG. 15, can be part of an operating system that has an improved DNS client/caching system. For requests based on user activity, the OS can monitor when an application is launched and proactively make DNS requests for that client. For example, the DNS requests could be one or more previous requests the application made the last time it was launched. For expiry based on server reachability, the operating system may monitor network connection failures to particular IP addresses and expire DNS cache entries associated with those IP address. In an implementation, the system and flow in FIGS. 15-16 is implemented in an optimization application separate from the operating system. For example, the monitoring module can be in an optimization application that monitor other applications on the system and the servers contacted by those applications to determine which host names to proactively resolve when a user is engaged with each application. The monitoring module may use a variety of techniques to determine servers contacted by other applications. Examples include, but are not limited to, monitoring network traffic generated by an application via an operating system interface, monitoring a list of active TCP connections for the application via an operating system interface, and monitoring the operating system's DNS client via its cache or another interface. Instead of directly controlling the DNS cache, the optimization application may initiate a DNS request via the operating system's DNS client to resolve a hostname to populate the operating system DNS cache so that when another application needs to resolve the IP address for a particular hostname, that resolution is already cached locally by the operating system.

In another specific implementation, aspects of the systems and flows in FIGS. 13-16 are implemented in combination with each other. For example, a combined system may include pre-resolving both server 405, which may be referred to as the safe browsing server, and one or more of target servers 1520 and 1525.

Android Intents

In a specific implementation, request 325 (FIG. 3) is an Android Intent and the system is designed to provide mobile web protection to Android OS-based devices (e.g., smartphones) through a feature referred to as Intent Proxying. Many functions on Android OS devices, especially functions that reach across apps, are accomplished using mechanisms called intents. For example, an app may launch an intent to send an e-mail message. Android allows the user to have many different e-mail apps installed, and these various apps will all declare that they can receive this intent using an intent-filter. When the user clicks "Send E-mail" in one app, the application sends an intent to the operating system indicating that an e-mail should be sent, potentially also including the recipient, subject, and body for the message. When the operating system receives this intent, it either chooses the default e-mail client based on configuration or launches a popup showing all of the e-mail apps that can be used to complete the action, such as, Gmail, Yahoo Mail, Outlook, and the like. The user selects one of the options, and that app launches to complete the e-mail sending process. According to the Android documentation, an intent is defined as: "an abstract description of an operation to be performed. Its most significant use is in the launching of activities, where it can be thought of as the glue between activities. It is basically a passive data structure holding an abstract description of an action to be performed."

In this specific implementation, the mobile device system (e.g., web protection application 306—FIG. 3) declares an intent-filter for relevant intents such as those that load a URL. When set as the default handler for a particular type of intent, such as visiting HTTP URLs, the system is launched when a user follows a link in any app, whether or not their browser is already open, thereby positioning itself to intercept all desired intents before they can cause action on the device. The mobile device system can thus intercept an intent, perform some action, then launch another intent to pass the command along to another app. Because the system may be the default handler for the intent being intercepted, the intent may need to be modified so that it reaches an intended destination and does not simply re-launch the system. In this case, the intent may be modified to specify a particular application, such as a browser or phone dialer, that will receive it, thereby overriding the default handler that might be declared in the system. Such a proxying mechanism may be used to prevent undesirable intents from occurring and actions from being executed while permitting desirable intents and corresponding actions.

In a specific implementation, in the case of Web Protection, the system captures intents that will load a web page by declaring an intent-filter and being set as the default handler for those types of intents. When intercepting a URI, the system checks it in various ways and makes a judgment on its safety. If it is safe, the system re-launches the received intent with specific information (e.g. specifying the package name for the intended receiver) indicating that the URI should be opened in the user's chosen web browser rather than by the default handler (i.e., the web protection system). If the URI is not safe, system displays a warning page instead of re-sending the intent. In one embodiment, the checking of the URI is performed locally at the mobile client device (see FIG. 6 and accompanying discussion). In another embodiment, the checking of the URI is performed at a server (see FIG. 5 and accompanying discussion).

In a specific implementation, the system provides the ability to filter content via Intent Proxying. Intent Proxying may be used for general content filtering or prevention of undesirable events. For Web Protection, a use of Intent Proxying is to identify intents that will cause a web page to be loaded and prevent certain pages from loading. Other undesirable events may be prevented in the same or similar way. For example, the intent to send an SMS message may be intercepted if the recipient number is associated with a known malicious entity. Some other uses of Intent Proxying include: filtering intents based on resource consumption of their targets (e.g., battery preservation and cost reduction as discussed above). For battery preservation, an intent to launch a streaming video may be intercepted and stopped if the system suspects that loading the video would kill the battery. For cost reduction, an intent to perform an action that could cost money, such as sending an SMS, initiating a phone call, or loading a web page, may be intercepted and stopped if that action would cause the user to exceed the limitations of their mobile service plan and incur additional charges.

Another use of Intent Proxying includes parental controls. Specifically, an intent to initiate or receive communication (e.g. a phone call or SMS message) with an unknown party may be intercepted and stopped. For example, a parent could set a policy on their child's phone that only allows communication with those on the phone's contact list. An intent to view a video may be intercepted, and the content rating of that video may be determined via a third-party service. Only videos of a certain rating level would be allowed to proceed.

Some examples of intents used for malicious behavior include: an intent being launched by one application to open a piece of content in another application. For example, a web page could fire an intent to launch a malicious image file; when that file is opened in the Gallery app it would maliciously exploit that app. In this case, the intent to launch an image may be intercepted by the system, the image would be examined for evidence of malicious code, and blocked or allowed to load based on the assessment.

More particularly, on Android, i.e., Android OS-based devices, there are various apps that launch for different types of URIs. URIs pointing to web pages will generally be launched in a browser. The Android device typically comes with a standard browser, and other browsers (such as Opera and Skyfire) can be downloaded by the user. The user can select a default browser. If none is selected, a popup with a list of available browsers is shown when the user attempts to load a web page. Apps can declare intent-filters for particular URIs and attempt to intercept certain types of URIs. For example: The YouTube app will attempt to intercept any URI that points to a video page on the YouTube website. The Google Maps app will attempt to intercept any URI that points to a map page on the Google Maps website. The phone dialer app will attempt to intercept a URI that points to a phone number. A PDF Viewer app will attempt to intercept a URI that points to a PDF file. These URIs are handled the same way regardless of the app that initiates the URI loading intent; it doesn't matter whether the link is clicked in a web page, e-mail message, SMS message or other app.

In a specific implementation, intercepted URIs are delivered to a Web Protection service as shown in steps 515 and 520 of FIG. 5. The intent filtering process gives the server system (e.g., analysis module 410—FIG. 4) a URI to examine. The URI intercepting application on the client device (e.g., web protection application 306—FIG. 3) connects to a server, either operated by the system or operated by a third-party link checking service. The server compares the URI to a large list of URI's in a database (e.g., identifier list 415—FIG. 4). If the URI is already known by the database, the server will return an assessment. If the URI is not known by the database, the server will visit the page in question and perform an analysis on the page contents. The result of that analysis will be a set of one or more categories. This may be referred to as an Assessment. The server returns the assessment to the mobile client via the API response.

The mobile client can then act on the assessment. Specifically, the client receives the assessment from the Server API. The API response includes an assessment of one or more categories that the page falls into. Some example classifications are listed in FIG. 11. Classifications are divided into categories. A set of categories from the assessment map to a smaller set of responses that the system provides. For example, the system may have a "Malicious sites" category, and the response will be blocking the page from loading. Several categories from the list in FIG. 11 would map to that category, e.g. Botnet, Malware Call-Home, Malware Distribution Point. As another example, a set of categories will be classified as Phishing or scam sites, and the pages would be prevented from loading. A set of categories will be classified as "risky" but not absolutely malicious, and the user would see a warning but the page would be allowed to load.

In a specific implementation, an assessment is combined with other factors. In this specific implementation, a set of categories will be classified as interacting with "sensitive data," e.g., Login screens, Social Networking, Banking Sites, and so forth. If the user is on an unsecured network connection and the URI specifies an unencrypted protocol (e.g., HTTP), they will be warned about the risks of opening these pages before the page loads. They will also be given the option to switch to a more secure connection, such as a cellular network, if the system detects that one is available or a more secure protocol, such as HTTPS, if the site supports it. In an embodiment, the assessment includes an alternate, secure URI for a site that interacts with sensitive data and the system will modify the URI it receives to include the secure URI instead of the original URI. For example, if a user attempts to visit "http://www.facebook.com/login" the web protection system intercepts the intent specifying that URI, sends it to the server, and receives an assessment indicating that the URI interacts with sensitive data and specifies that the secure URI is "https://www.facebook.com/login." Based on the assessment, the web protection system sends a new intent specifying the secure URI for the browser to visit, thereby opportunistically increasing the level of security for the user.

It is generally expected that most URIs will get a positive assessment, meaning the categories to which they belong do not fall into any of the system's risky or dangerous categories. Those pages will be allowed to load. In a specific implementation, to load the page, a second request will be sent that looks much like the original request that was intercepted by the mobile client system. The mobile client system is configured to ignore requests that are initiated by web protection application 306 (FIG. 3), so instead of intercepting the request it will be allowed to follow its normal path. At that point, the other apps on the phone or client device will attempt to act on the request. If there is a default browser, it will open web pages. If there are multiple browsers, the user will be asked which to use. If another app, like Google Maps or YouTube, is configured to intercept the URI then that process will be allowed to continue as usual. In a specific implementation, the mobile client system adds specific destination information to the second request so that it is routed by the operating system to the appropriate application rather than being intercepted by the mobile client system. For example, on Android, the second request is an intent that is configured to route to the package name of the default browser on the operating system.

In a specific implementation, the system provides a custom web browser for Android with Web Protection built-in. In this specific implementation, the API checking and response aspects, as discussed above, are the same. However, the intent intercept functionality would not be necessary in this case. The app instead accesses the URI from the URI bar in the browser. Since the app would have access to the content of each page, it could also proactively check every URI that is linked to from the currently displayed page.

In this specific implementation, after the page loads (or as it loads) the browser app scans the page code for any URI strings. All the URIs are compiled into a single call to the server API. The assessments of all the URIs are returned to the browser. The browser may wait for a URI to be clicked, then immediately give the user a warning. Or, the app may pop up a message as soon as the assessment is returned by the API, warning the user that the page they are currently viewing contains links to undesirable sites.

In another specific implementation, the system provides a local API on the client device that is used by other browsers for Web Protection. The system provided app exposes an API to other apps on the client device. Any app that loads a URI could access this API. As an example, consider a standard web browser. Each time the web browser begins to load a page, it first calls the system's Web Protection Local API. The app sends a URI to examine. An assessment for that URI is received at the client device based using the methods above, though not using Intent Proxying. The system checks the local cache, then checks the Server API, receives the server's categories for the page, translates those categories into the system's category list, and passes an assessment back to the browser. The browser performs the action of loading the page, blocking the page, or warning the user.

In a specific implementation, the determination of the result for a link includes the client sending a request to server (e.g., Web Protection analysis server) for a result regarding a URI. In this specific implementation, the communication method is an API operating on the DNS protocol. The input includes: (1) a URI to be checked, (2) a security key to confirm to the vendor that the request is legitimate, and (3) an identification key to indicate that the API call is coming from a system user. The server can return results: synchronously, if the URI has a known assessment ready; or asynchronously, if the URI is not known and deeper analysis is needed. In this case the server can return "pending" result as opposed to an authoritative result.

In a specific implementation, the system provides a dynamic evaluation policy which takes context into account. Some criteria that may cause evaluation policy to be differentiated include the source of the request. For example, when the system receives a request for an action to be performed, such as an intent, the request may contain an identifier for the source of the request (e.g., package name of the originating application, URL of a site containing a link, phone number sending a text message containing a link, address of the sender of an e-mail message containing a link). That source identifier is used to determine the policy for how to treat the rest of the identifier evaluation process. In order to determine evaluation policy for a given source identifier a list of identifiers, such as has been described herein, may be used. For example, requests from a messaging application may be treated differently from requests from a web browser (e.g., messaging links have a more paranoid policy than web browser); links on a social network may be treated differently than links on a trusted domain; links that stay within the same domain may be treated differently than links that reference a new domain (e.g., if the last link scanned has the same domain name as the current, have lower timeout); and dynamic reputation of the app or site originating the request (e.g., today Facebook has malware propagating over it, so use a stricter policy). In a specific implementation, the source identifier for a request is transmitted to the server so the server can take that into account in its evaluation. For example, URLs that originate from a trusted domain may be treated differently than URLs that originate from an e-mail or text messaging client.

Some techniques for how evaluation policy can be differentiated include latency timeout (e.g., for a trustworthy sources, be more willing to skip scanning in a timeout condition). There can be synchronous, asynchronous, or delayed batched (e.g., For less trustworthy sources, wait for a result before allowing user to proceed. For more trustworthy sources, allow user to proceed while waiting for a result to improve user experience). There can be a variable response triggered by reputation level of a source. In some cases, the system disallows browsing to a site, pops up a warning to the user about the site, or changes browser settings (e.g., automatic quarantine of files downloaded from sites below reputation minimum). For example, if a user visits a URI that includes a domain with a known poor reputation, then the latency timeout for evaluating URIs may be significantly longer than the latency timeout for a URI that includes a domain with a known good reputation.

Scanning

In another specific implementation, the system provides for link scanning. In this specific implementation, the software pre-scans URIs that appear in e-mail messages, SMS messages, and other areas of a mobile device. Each link is examined when it first appears on the mobile device, regardless of whether the user has loaded the link in a web browser. The user may also perform a periodic scan of all links on the device.

For example, there can be pre-scanning of message boxes. Users are often tricked into visiting malware and phishing sites through deceptive links in a message, including spam messages. The system provided app can gain access to the contents of a user's message accounts on a device, including the e-mail inbox, SMS inbox, MMS inbox, and other areas where messages are received. The system scans the contents of all incoming messages and checks for URIs. When a URI is found, it is checked against the local cache then against the server API. As soon as a bad URI is identified, the user will be notified. The assessment may also be placed in the local cache, in case the user ignores (or doesn't see) the warning and attempts to visit the URI later.

In another specific implementation, the system is adapted to check links that the user is sending to other people. This feature may be referred to as "Link safety for outgoing messages." In this specific implementation, the system may check all links in outgoing e-mail and SMS messages in a manner similar to the checking of incoming messages described above.

In this specific implementation, a keyboard input provider (on Android the user can opt to use a custom input provider for all text input) could watch for certain strings that would indicate a URI or URL, such as a string containing periods and starting with "http" or "www." The same check may be performed on these URIs. If a bad URI is detected, the system prevents the message from being sent and displays an alert to the user.

In another specific implementation, the system provides browser history checking. In this specific implementation, URIs to check may be found in the browser history. Items are placed in the browser history the moment the page loads. This can provide for a good secondary method for URI acquisition when the Intent Proxying method is not available. In this specific implementation, the system consumes the contents of the browser history and checks each URI as soon as it is added. If a URI is dangerous, the system pops up a notification over the browser window to warn the user and encourage them to leave the page.

User Behavior Evaluation

In a specific implementation, the system provides for user behavior evaluation. In some cases, malicious site authors may try to use this system to test whether their sites are detectable. Thus, the system profiles users based on likelihood of clicking on unsafe links to determine a response. Users who click a disproportionately large number of malicious sites are flagged as potential malware authors. Various actions may be taken against those authors. For example, if a user is detected to be a malicious site author, the system may return a false response indicating that the site is safe, but all other users receive an indication that the site is malicious.

In the description above and throughout, some operations are described as occurring at the mobile device client while other operations are described as occurring at the server. However, it should be appreciated that any operation described as occurring at the mobile device may instead occur at the server. Similarly, any operation described as occurring at the server may instead occur at the mobile device. For example, evaluation (e.g., policy evaluation) may occur at the mobile device or server. A policy that is evaluated at the mobile device may be referred to as a client-evaluated policy. A portion of the evaluation may occur at the mobile device and another portion of the evaluation may occur at the server. A policy may be stored at the mobile device, server, or both. An identifier list may be stored at the mobile device, server, or both.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:
    monitoring, by a monitoring module at a mobile device, mobile device user activity
    based on the monitored activity, determining that a potential action will trigger a call by an application program to contact at least one target server;
    before occurrence of the potential action that will trigger the call by the application program to contact the at least one target server, periodically generating a domain name system (DNS) request to resolve a host name associated with the at least one target server; and
    at the mobile device, receiving an address corresponding to the host name in response to the DNS request, wherein the address is to be stored in a cache at the mobile device.

2. The method of claim 1 wherein the monitoring module is internal to an operating system of the mobile device.

3. The method of claim 1 wherein the monitoring module is external to an operating system of the mobile device.

4. The method of claim 1 wherein the determining that a potential action will trigger a call by an application program to contact the at least one target server comprises:
    detecting a launch of the application program; and
    determining that after a prior launch of the application program, the application program called the at least one target server.

5. The method of claim 1 comprising:
    upon detecting the call by the application program to contact the at least one target server, resolving the host name associated with the target server locally via the cached address.

6. The method of claim 5 comprising:
    determining that the application program is unable to contact the at least one target server via the cached address; and
    based on the application program being unable to contact the at least one target server via the cached address, expiring the cached address.

7. The method of claim 1 wherein the at least one target server is a first target server, the call is a first call, the DNS request is a first DNS request, and the method further comprises:
    detecting a launch of the application program;
    determining that after a prior launch of the application program, the application program made the first call to the first target server and made a second call to a second target server, different from the first target server; and
    prior to the first and second calls being triggered and while the user is engaged in the activity, periodically generating the first DNS request to resolve the host name associated with the first target server, and periodically generating a second DNS request to resolve a host name associated with the second target server.

8. The method of claim 1 wherein the address comprises an Internet Protocol (IP) address.

9. A method comprising:
    monitoring, by a first application program at a mobile device, mobile device user activity associated with a second application program at the mobile device;
    based on the monitored activity, determining that the second application program will make a request comprising contacting a resource;
    determining that when the request is made to contact the resource the request should be evaluated by a safe browsing server to determine whether the request should be permitted;

prior to the request being made to contact the resource and while the user is engaged in the activity, periodically generating a domain name system (DNS) lookup request to resolve a host name associated with the safe browsing server;

at the mobile device, receiving an Internet Protocol (IP) address corresponding to the host name in response to the DNS lookup request, wherein the IP address is to be stored in a cache at the mobile device; and upon detecting that the second application program has made the request, intercepting the request and attempting, by the first application program, to contact the safe browsing server via the cached IP address for evaluation of the request.

10. The method of claim 9 wherein if the user is not engaged in the activity, not periodically generating the DNS lookup request to resolve the host name.

11. The method of claim 9 wherein the step of prior to the request being made and while the user is engaged in the activity, periodically generating a DNS lookup request includes generating the DNS lookup request after a threshold time period has elapsed, wherein the threshold time period is different from a time-to-live (TTL) value associated with the cached IP address.

12. The method of claim 11 wherein the threshold time period is about 5 minutes.

13. The method of claim 9 comprising:
determining that the first application program is unable to contact the safe browsing server via the cached IP address; and
based upon the first application program being unable to contact the safe browsing server using the cached IP address, expiring the cached IP address and generating a DNS lookup request to re-resolve the host name.

14. The method of claim 9 wherein the step of based on the monitored activity, determining that the second application program will make a request comprising contacting a resource comprises:
determining that a prior request comprising contacting the resource has been made within a threshold rolling time period.

15. The method of claim 14 wherein the threshold rolling time period is about 5 minutes.

16. The method of claim 9 wherein the step of based on the monitored activity, determining that the second application program will make a request comprising contacting a resource comprises:
making the determination based on the second application program being in a foreground of the mobile device.

17. The method of claim 9 wherein the step of based on the monitored activity, determining that the second application program will make a request comprising contacting a resource comprises:
making the determination based on a display of the mobile device being in an active state.

18. A method comprising:
intercepting, by a first application program at a mobile device, a request comprising an identification of a resource to be contacted by a second application program on the mobile device;
without resolving the identification of the resource to be contacted by the second application program, attempting, by the first application program, to connect to a server for evaluation of the request via an Internet Protocol (IP) address stored in a cache at the mobile device and associated with a host name of the server;
determining that the first application program is unable to connect to the server using the cached IP address; and
based upon the first application program being unable to connect to the server using the cached IP address, expiring the cached IP address to generate a DNS lookup request to re-resolve the host name.

19. The method of claim 18 wherein when the cached IP addressed is expired, a time-to-live (TTL) value associated with the cached IP address has yet to elapse.

20. The method of claim 18 wherein the expiring the cached IP address is independent of a time-to-live (TTL) value associated with the cached IP address.

21. The method of claim 18 wherein the step of without resolving the identification of the resource to be contacted by the second application program, attempting, by the first application program, to connect to a server for evaluation of the request via an Internet Protocol (IP) address stored in a cache at the mobile device and associated with a host name of the server comprises:
not contacting the resource by the second application program.

22. The method of claim 18 comprising:
receiving from the server an evaluation of the request comprising the identification of the resource to be contacted by the second application program;
if the evaluation indicates that the resource is malicious, not resolving the identification of the resource; and
if the evaluation indicates that the resource is not malicious, resolving the identification of the resource.

* * * * *